US012785945B2

(12) United States Patent
Yu et al.

(10) Patent No.: US 12,785,945 B2
(45) Date of Patent: Nov. 3, 2026

(54) KEY MANAGER, QUANTUM CRYPTOGRAPHIC COMMUNICATION SYSTEM, QKDN CONTROL DEVICE, INFORMATION PROCESSING DEVICE, KEY MANAGEMENT METHOD, QKDN CONTROL METHOD, INFORMATION PROCESSING METHOD, AND PROGRAM PRODUCT

(71) Applicant: KABUSHIKI KAISHA TOSHIBA, Tokyo (JP)

(72) Inventors: Yu Yu, Kawasaki Kanagawa (JP); Yoshimichi Tanizawa, Yokohama Kanagawa (JP)

(73) Assignee: KABUSHIKI KAISHA TOSHIBA, Kawasaki Kanagawa (JP)

( * ) Notice: Subject to any disclaimer, the term of this patent is extended or adjusted under 35 U.S.C. 154(b) by 6 days.

(21) Appl. No.: 18/533,412

(22) Filed: Dec. 8, 2023

(65) Prior Publication Data

US 2024/0313955 A1 Sep. 19, 2024

(30) Foreign Application Priority Data

Mar. 17, 2023 (JP) ................................ 2023-043319

(51) Int. Cl.
*H04L 9/08* (2006.01)

(52) U.S. Cl.
CPC ............ *H04L 9/0852* (2013.01); *H04L 9/085* (2013.01)

(58) Field of Classification Search
CPC ... H04L 9/0852; H04L 9/0858; H04L 9/0855; H04L 63/061; H04L 9/083; H04L 9/0822;
(Continued)

(56) References Cited

U.S. PATENT DOCUMENTS 5,764,765 A * 6/1998 Phoenix ................ H04L 9/0858 380/256
6,748,083 B2 * 6/2004 Hughes ................ H04L 9/0858 380/278
(Continued)

FOREIGN PATENT DOCUMENTS

EP 528 429 A1 8/2019
EP 896 897 A1 10/2021
(Continued)

OTHER PUBLICATIONS

Japan Patent Office, Decision to Grant a Patent in JP App. No. 2023-043319 (Sep. 2, 2025).
(Continued)

*Primary Examiner* — Sharif E Ullah
(74) *Attorney, Agent, or Firm* — Finnegan, Henderson, Farabow, Garrett & Dunner, LLP

(57) ABSTRACT

A key manager according to one embodiment is connected to a QKD device generating a link key by QKD. The key manager includes a communication interface and a processor. The communication interface receives, from a source application of a user network, information for identifying the source application, information for identifying a destination application, and a requested amount of an application key used for encrypting or decrypting communication in the user network. The processor identifies a key manager as a sharing destination of the application key and determines a sharing amount. The processor causes the communication interface to transmit the application key to the key manager as the sharing destination. The application key to be transmitted has been encrypted by using the link key and satisfies the sharing amount. The processor causes the communication interface to transmit the application key of the requested amount to the source application.

10 Claims, 17 Drawing Sheets

(58) Field of Classification Search

CPC ....... H04L 9/3226; H04L 9/0891; H04L 9/14; H04L 9/0827; H04L 2209/24; H04L 9/08; H04L 9/0819; H04L 9/088; H04L 9/0869; H04W 12/041; H04W 12/0431; H04W 12/0433; H04W 12/04; H04W 12/61; H04W 12/63; H04W 12/71; G06F 21/31; G06F 21/44; G06F 7/588; G06F 21/72; G06F 21/86

USPC ........ 380/278, 255, 264, 276; 726/2, 21, 36; 713/150, 163, 181

See application file for complete search history.

(56) References Cited

U.S. PATENT DOCUMENTS 7,437,081 B2 * 10/2008 Mitchell ................ H04B 10/70 398/154
8,855,316 B2 * 10/2014 Wiseman .............. H04L 9/0855 380/278
9,960,465 B2 * 5/2018 Dudley ............... H01M 50/204
10,057,058 B2 * 8/2018 Murakami ............ H04L 9/0858
2005/0138352 A1 * 6/2005 Gauvreau ............. H04L 9/3247 713/153
2005/0221759 A1 * 10/2005 Spadafora .............. G08G 1/093 455/39
2007/0065154 A1 * 3/2007 Luo ....................... H04L 9/0852 398/141
2007/0076884 A1 * 4/2007 Wellbrock ............ H04L 9/0855 380/263
2007/0195774 A1 * 8/2007 Sherman ................. H04L 69/16 370/392
2009/0316910 A1 12/2009 Maeda et al.
2011/0206204 A1 * 8/2011 Sychev ................... H04J 14/06 380/256
2011/0213979 A1 * 9/2011 Wiseman .............. H04L 9/0844 713/171
2011/0243331 A1 * 10/2011 Yasuda ................. H04L 9/0836 380/46
2012/0045208 A1 * 2/2012 Yasuda .................. H04B 10/60 398/65
2012/0082464 A1 * 4/2012 Yasuda .............. H04B 10/6166 398/152
2012/0237202 A1 * 9/2012 Abe ................... H04B 10/6164 398/16
2013/0051790 A1 * 2/2013 Yasuda .............. H04B 10/6151 398/16
2013/0266308 A1 * 10/2013 Fukuchi ............... H04B 10/616 398/16
2014/0010234 A1 * 1/2014 Patel ....................... H04L 45/74 370/392
2014/0068765 A1 * 3/2014 Choi ................... H04L 63/1416 726/23
2014/0133652 A1 * 5/2014 Oshida .................. H04L 9/0897 380/255
2014/0181508 A1 * 6/2014 Tanizawa .............. H04L 9/0827 713/162
2014/0286638 A1 * 9/2014 Yasuda ................... H04J 14/06 398/65
2014/0365786 A1 12/2014 Tanizawa et al.
2015/0372765 A1 * 12/2015 Yasuda ................ H04B 10/613 398/29
2016/0036554 A1 * 2/2016 Yasuda ................... H04J 14/06 398/65
2016/0050025 A1 * 2/2016 Yasuda .............. H04B 10/6165 398/65
2016/0155327 A1 * 6/2016 Schlienz ................ A61H 3/061 340/907
2016/0197723 A1 * 7/2016 Takahashi ........... G06F 11/0709 380/255
2016/0241396 A1 * 8/2016 Fu ......................... H04L 9/0836
2016/0269177 A1 9/2016 Tanizawa
2016/0359626 A1 * 12/2016 Fu ......................... H04L 9/0858
2016/0366094 A1 * 12/2016 Mason ................ H04L 61/5038
2017/0214525 A1 * 7/2017 Zhao ................. H04W 12/0431
2017/0230173 A1 * 8/2017 Choi ..................... H04L 9/0861
2017/0338895 A1 * 11/2017 Yasuda .............. H04B 10/6971
2017/0338952 A1 * 11/2017 Hong ...................... H04L 9/083
2018/0176091 A1 * 6/2018 Yoon .................. H04L 43/0888
2018/0248582 A1 * 8/2018 Yasuda ..................... H04J 11/00
2019/0036821 A1 * 1/2019 Levy ................... G06F 12/0868
2019/0115983 A1 * 4/2019 Yasuda ................ H04B 10/612
2019/0260581 A1 * 8/2019 Su ............................. H04L 9/08
2019/0349392 A1 * 11/2019 Wetterwald ......... H04L 43/0852
2020/0084222 A1 * 3/2020 William .................. H04L 63/12
2021/0119788 A1 * 4/2021 Wang ...................... G02F 1/313
2022/0209943 A1 6/2022 Syrivelis et al.
2022/0360434 A1 * 11/2022 Choi ....................... H04L 41/40
2024/0283638 A1 * 8/2024 Yasuda ................... H04L 9/085
2025/0141671 A1 * 5/2025 Kawakami ............ H04L 9/0819

FOREIGN PATENT DOCUMENTS

JP 2008-306633 A 12/2008
JP 2014-241463 A 12/2014
JP 5784562 B2 9/2015
JP 2016-171530 A 9/2016
JP 6426477 B2 11/2018

OTHER PUBLICATIONS

EPO, Partial European Search Report in EP 23218887.0, 15pages (Jun. 12, 2024).

Kaoru Kenyoshi, et al., "Proposed modifications to the draft Recommendation ITU-T Y.QKDN-KM 'Key management for quantum key distribution Network,'" ITU Telecomm. Standardization Sector, 23 pages, XP044291587, https://www.itu.int/ifa/t/2017/sg13/exchange/wp3/q16/202005/contributions/Q16-13-may20-C119R1-Y.QKDN_KM_NICT.docx (2020).

ITU-T Y.3800, "Overview on networks supporting quantum key distribution," 22 pages (2019).

ETSI GS QKD 014 V1.1.1, "Quantum Key Distribution (QKD); Protocol and data format of REST-based key delivery API," 22 pages (2019).

* cited by examiner

FIG.7

| PAIR INDEX NUMBER | APPLICATION ID | KM ID |
|---|---|---|
| 1 | 192.168.1.112<br>(Application A) | 16.10.1.1<br>(KM 10a) |
| 2 | 192.168.11.36<br>(Application D) | 16.10.11.7<br>(KM 10d) |
| 3 | 2001:db8:20:3:10:1c:1:4df<br>(Application A) | 16.10.1.1<br>(KM 10a) |
| 4 | 2001:db8:20:3:10:1c:11:8<br>(Application D) | 16.10.11.7<br>(KM 10d) |
| ... | ... | ... |

FIG.9

| QKD IDENTIFIER | KSN IDENTIFICATION NUMBER | KM IDENTIFICATION NUMBER |
|---|---|---|

FIG.12

| PAIR INDEX NUMBER | TYPE | APPLICATION ID | KM ID | KSN ID |
|---|---|---|---|---|
| 1 | i | 193.16.1.112 (Application A) | 16.10.1.1 (KM 10a-1) | #a |
| 2 | i | 2001:db8:16:3:10:1c:1:4df (Application A) | 16.10.1.1 (KM 10a-1) | #a |
| 3 | i | 133.166.12.56 (Application D) | 16.10.1.1 (KM 10a-1) | #a |
| ... | ... | ... | ... | ... |
| k | o | 193.28.11.36 (Application B) | xxxxxb0333 (KM 10b-1) | #b |
| k+1 | o | 2001:db8:28:d:1f:16:11:8e (Application B) | xxxxxb0333 (KM 10b-1) | #b |
| ... | ... | ... | ... | ... |

FIG.13

| TYPE | SEQUENCE INFORMATION | SOURCE KM ID | DESTINATION KM ID | ENCRYPTED APPLICATION KEY | DECRYPTED APPLICATION KEY |
|---|---|---|---|---|---|
| i | ttttttt123 | 16.10.1.1 (KM 10a-1) | xxxxx0b333 (KM 10b-1) | aaaaaaaa Mbits | bbbbbbbb Mbits |
| i | ttttttt388 | 16.10.1.1 (KM 10a-1) | xxxxx0b666 (KM 10b-x) | cccccccc Mbits | dddddddd Mbits |
| o | ttttttt123 | xxxxxb0333 (KM 10b-1) | 16.10.1.1 (KM 10a-1) | bbbbbbbb Mbits | aaaaaaaa Mbits |
| o | ttttttt292 | xxxxx0b666 (KM 10b-x) | 16.10.1.1 (KM 10a-1) | eeeeeeee Mbits | ffffffff Mbits |
| ... | ... | ... | ... | ... | ... |

KEY MANAGER, QUANTUM CRYPTOGRAPHIC COMMUNICATION SYSTEM, QKDN CONTROL DEVICE, INFORMATION PROCESSING DEVICE, KEY MANAGEMENT METHOD, QKDN CONTROL METHOD, INFORMATION PROCESSING METHOD, AND PROGRAM PRODUCT

CROSS-REFERENCE TO RELATED APPLICATIONS

This application is based upon and claims the benefit of priority from Japanese Patent Application No. 2023-043319, filed on Mar. 17, 2023; the entire contents of which are incorporated herein by reference.

FIELD

Embodiments of the present disclosure relate generally to a key manager, a quantum cryptographic communication system, a QKDN control device, an information processing device, a key management method, a QKDN control method, an information processing method, and a program product.

BACKGROUND

In the related art, there is known technology that an application acquires random numbers shared with another application by using quantum key distribution (QKD) from a key manager and performs cryptographic communication with another application by using the random numbers as an encryption key. The cryptographic communication between the applications is performed in a user network such as the Internet, which is different from QKD networks.

However, in the related art, as the scale of the QKD network increases, it is difficult to correlate an application with a key manager that transmits an encryption key to the application.

BRIEF DESCRIPTION OF THE DRAWINGS

FIG. 7 is a table illustrating an example of mapping information according to the first embodiment;

FIG. 9 is a diagram illustrating an example of an ID system for identifying a KM according to the second embodiment;

FIG. 12 is a table illustrating an example of mapping information according to the second embodiment;

FIG. 13 is a table illustrating an example of state information according to the second embodiment;

DETAILED DESCRIPTION

A key manager according to one embodiment is connected to a quantum key distribution (QKD) device generating a link key by QKD. The key manager includes a communication interface and a processor. The communication interface is configured to receive, from a source application of a user network, request information of an application key including first identification information for identifying the source application, second identification information for identifying a destination application, and a requested amount of the application key used for encrypting or decrypting communication in the user network. The processor is configured to identify a key manager as a sharing destination of the application key from the second identification information. The processor is configured to determine a sharing amount of the application key from the requested amount of the application key. The processor is configured to cause the communication interface to transmit the application key to the key manager as the sharing destination. The application key to be transmitted has been encrypted by using the link key and satisfying the sharing amount. The processor is configured to cause the communication interface to transmit the application key of the requested amount to the source application identified by the first identification information.

Hereinafter, embodiments of a key manager, a quantum cryptographic communication system, a quantum key distribution network (QKDN) control device, an information processing device, a key management method, a QKDN control method, an information processing method, and a program product will be described in detail with reference to the accompanying drawings.

In the related art, for example, address registration processing for using an encryption function of a cryptographic communication network can be automated. However, it is necessary to install a dedicated library in each KM 10.

In a case where the scale of a QKD network is increased, for example, in a case where the number of KMs 10 is 1,000 or more, an address registration library of each KM 10 becomes enormous, and the processing efficiency decreases. In addition, it is desirable to perform determination processing of the key sharing amount based on a key accumulation state between KMs 10 depending on the required amount of keys for using the encryption function.

Figure 1:
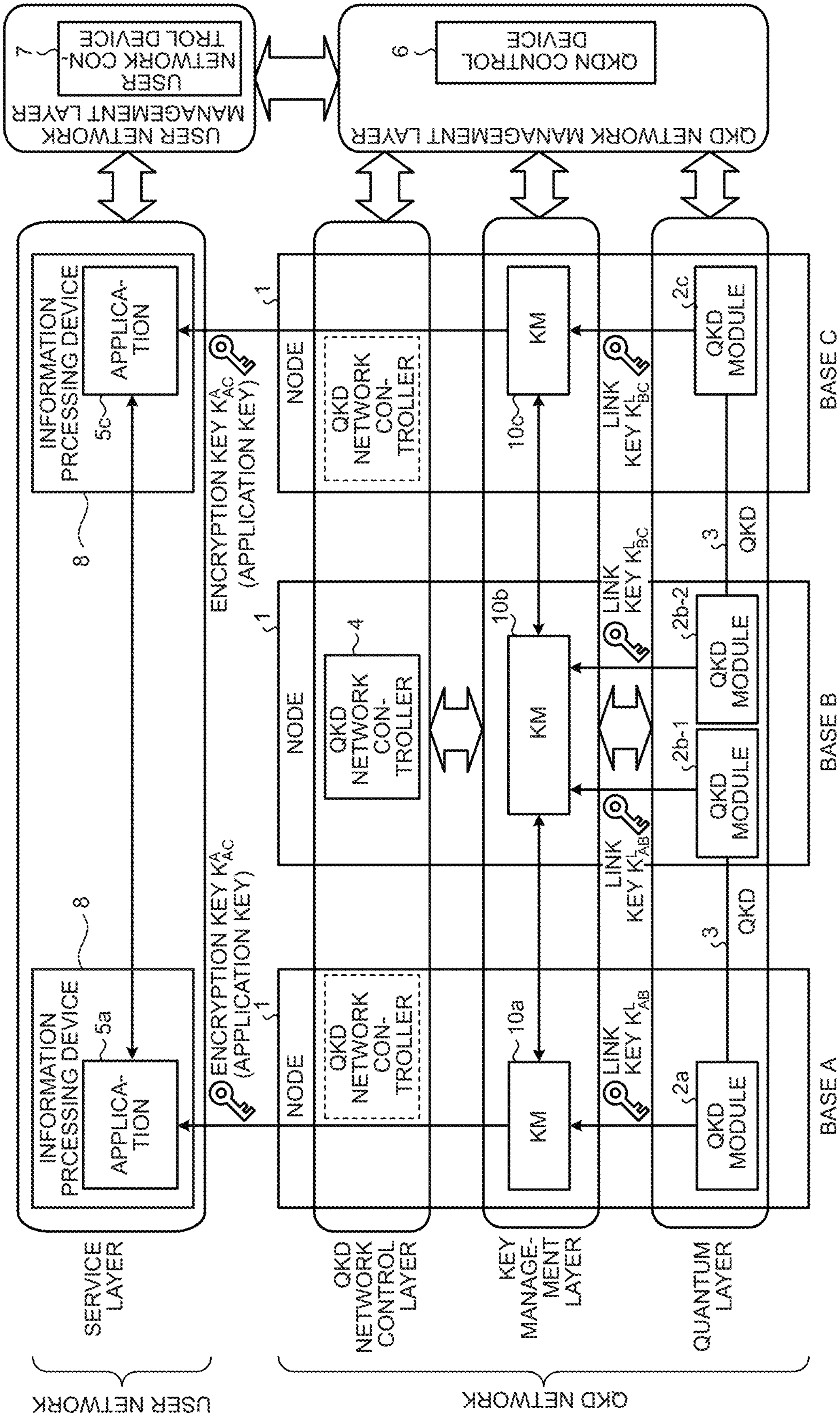
FIG. 1 is a diagram illustrating an example of the configuration of a quantum cryptographic communication system according to a first embodiment.

FIG. 1 is a diagram illustrating an example of the configuration of a quantum cryptographic communication system according to a first embodiment. Viewing FIG. 1 horizontally, a QKD network architecture includes, from the bottom, a quantum layer, a key management layer, and a QKD network control layer and a QKD network management layer for managing these three layers. With these four layers, an application key used for encrypting and decrypting data communication of an application 5 is generated and supplied to a service layer in the uppermost user network. Viewing FIG. 1 vertically, three nodes 1 (QKD nodes/trusted nodes) including the QKD network and the user network are individually installed in a base A, a base B, and a base C.

The quantum layer includes QKD modules 2 and QKD links 3. The main function of the quantum layer is to enable exchanging photons and classical information (control information transmitted and received in a normal control link different from the QKD link) with a QKD module 2 at another base and sharing a link key (random number sequence). The quantum layer also has a function of supplying a random number sequence to key managers (KMs) 10 (10*a* to 10*c*). A link key (quantum encryption key) shared by the QKD links 3 is guaranteed not to be eavesdropped based on the principle of quantum mechanics. When encrypted data communication is performed using a cryptographic communication scheme called a one-time pad by using a shared link key, it is guaranteed by information theory that data to be transmitted and received cannot be decrypted by eavesdroppers having any knowledge. The QKD modules 2 (2*a*, 2*b*-1, 2*b*-2, and 2*c*) are each connected by a QKD link 3 such as an optical fiber.

Note that the scheme of sharing a link key by the QKD technology has constraint of distance that the link key can be shared due to use of a single photon as a medium. For example, as illustrated in the example of the quantum layer in FIG. 1, the QKD modules 2 are basically on a one-to-one basis, however, in a case of relaying, at least two QKD modules 2*b*-1 and 2*b*-2 are required in the base B that performs the relaying. The example of FIG. 1 illustrates a case where an application key $K^{A}_{AC}$ is supplied to the base A and the base C. In the base B, the QKD module 2*b*-1 decrypts the application key encrypted in the base A with the same link key $K^{L}_{AB}$ (namely, a common key in which the encryption key and the decryption key are the same) as that of the base A. Then, the QKD module 2*b*-2 encrypts the decrypted application key again with the link key $K^{L}_{BC}$ and relays the encrypted application key $K^{A}_{AC}$ to the base C.

In QKD, communication performance such as the distance and the speed has to be sacrificed to some extent to ensure unconditional security. In general, a link key generation rate is about 200,000 to 300,000 bits per second (200 to 300 kbps) within a range of 50 km of laid fibers. In a case where QKD key distillation processing is hardware-optimized, the QKD key generation rate reaches a maximum of 10 Mbps for a short distance.

In order to maintain the key generation rate at Mbps, it is necessary to install relay nodes at distance intervals at which Mbps can be maintained and to perform key relay between bases that perform relay. Meanwhile, in the bases that perform the relay, it takes time for processing the encryption and decryption.

The key management layer includes key managers (KMs) 10*a* to 10*c* and KM links. The main functions of the key management layer include supply of an application key to the applications 5*a* and 5*c* that actually encrypt data, key relay to another base via a KM link, and others. Accompanying the functions above, the key managers (KMs) 10*a* to 10*c* perform overall key management such as reception of a key request from the applications 5*a* and 5*c* and storage of an interface.

The QKD network control layer includes a QKD network controller 4 and links. The QKD network control layer controls services of the QKD network in general. The QKD network controller may be installed in each base, or one (or more) QKD network controller(s) may be installed in the entire quantum cryptographic communication system as illustrated in FIG. 1. Moreover, the QKD network controller 4 and a KM 10 may be integrally implemented.

The QKD network management layer includes a QKDN control device 6. The QKD network management layer has a function of collecting performance information from each of the layers, monitoring whether or not services are operating properly, and commanding control to the QKD network control layer as needed. A plurality of QKDN control devices 6 may be provided depending on the configuration of the QKD network. Alternatively, the function of the QKDN control device 6 may be implemented by a KM10.

The service layer includes, although the configuration differs depending on a user, the applications 5*a* and 5*c* for implementing encrypted communication, computer modules, and others. In addition, the service layer has a function of encrypting the application key with the link key and transferring the encrypted application key to an adjacent node. Note that an application 5 in the service layer may separately generate an encryption key (application key) that is different from the link key from random number information or the like irrelevantly from QKD.

In the service layer, the application key is mainly used for encryption by a common encryption scheme. The common encryption scheme is an encryption scheme in which communication data and messages are encrypted and decrypted with the same application key shared in advance on the transmission side and the reception side. Specifically, the application key is used in advanced encryption standard (AES) encryption, one time pad (OTP) encryption, and others.

A user network management layer includes a user network control device 7. The user network management layer collects performance information from the service layer and monitors whether or not the services are operated properly.

Note that the architecture illustrated in FIG. 1 indicates basic elements. Actually, the configuration of the architecture may change depending on the situation. For example, the number of bases is not limited to three. Moreover, the number of applications 5 is not limited to two. Moreover, for example, the number of QKDN control devices 6 in the QKD network management layer is not limited to one.

The above-described user network is a public network, in which cryptographic communication is performed by the applications 5. The applications 5 operate in information processing devices 8 such as a personal computer or a smart device. The user network is, for example, a data communication network such as the Internet or a cellular communication network.

The above-described QKD network (quantum cryptographic communication network) is a private network, and nodes (QKD nodes/nodes) are installed depending on the actual needs. The nodes transmit an encryption key for cryptographic communication to the user network.

The user network and the QKD network are loosely coupled. Therefore, the applications 5 do not have information about the configuration of the QKD network. The information about the configuration of the QKD network is, for example, mapping information representing which application 5 is connected to which KM 10.

Figure 2:
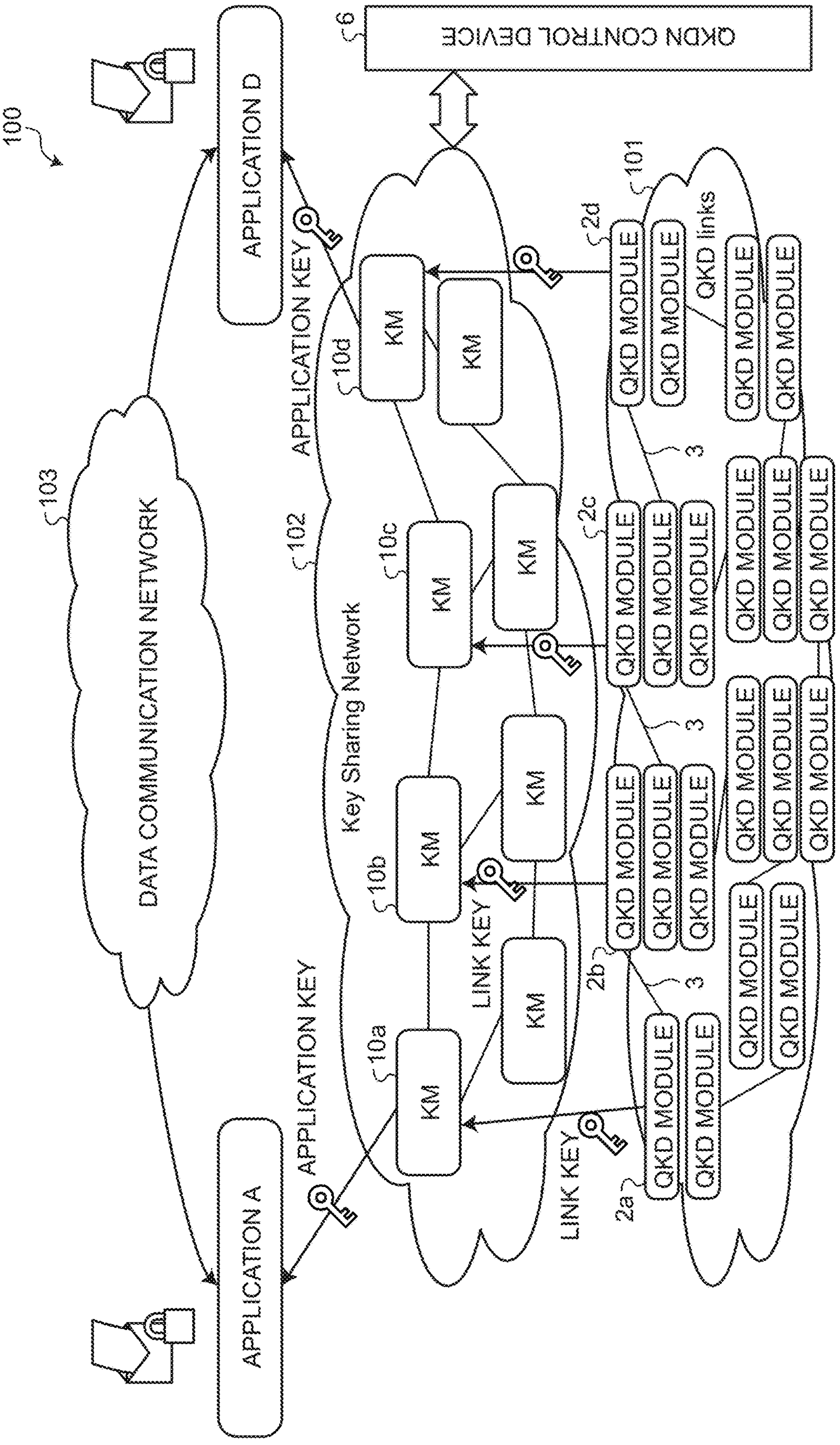
FIG. 2 is a diagram illustrating an example of a quantum cryptographic communication network according to the first embodiment.

FIG. 2 is a diagram illustrating an example of a quantum cryptographic communication network 100 according to the first embodiment. The example of FIG. 2 is of a small-scale QKDN since the number of KMs is as small as eight. Applications A and D in the user network perform secure communication via a data communication network 103.

A key sharing network (KSN) 102 in the key management layer includes KMs 10 and links between the KMs 10. In the QKDN management layer, the QKDN control device 6 that communicates with the KMs 10 of the key sharing network 102 is installed.

In the quantum layer, a network 101 including a plurality of QKD modules 2 and a plurality of QKD links 3 between the QKD modules 2 is configured. Since the connection between QKD modules 2 is one-to-one, the QKD modules 2 corresponding to a higher KM 10 are installed depending on the number of links connected to the higher KM 10.

Note that the number of KMs 10, the number of QKD modules 2, and the number of applications are not limited to the example of FIG. 2.

The mapping information of the KM 10 and the QKD module 2 includes a distributed scheme managed and shared by individual KMs 10 and a centralized system managed by a dedicated mechanism (for example, manage by only one authoritative route server device). In the present embodiment, a case where the mapping information is managed by the QKDN control device 6 will be described.

Exemplary Functional Configuration of KM

Figure 3:
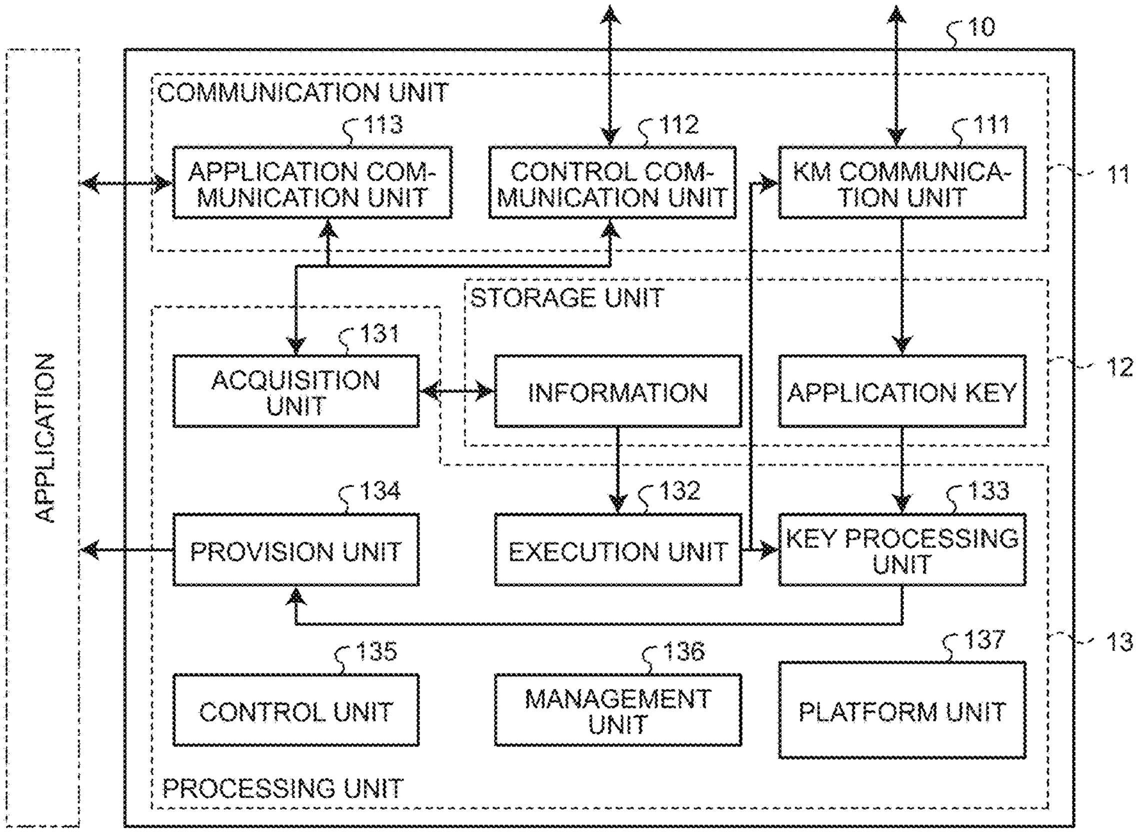
FIG. 3 is a diagram illustrating an example of a functional configuration of a key manager according to the first embodiment.

FIG. 3 is a diagram illustrating an example of the functional configuration of a key manager (KM) 10 of the first embodiment. The key manager (KM) 10 of the first embodiment includes a communication unit 11, a storage unit 12, and a processing unit 13.

The communication unit 11 is implemented by a communication interface that performs communication in at least one of a wireless manner and a wired manner. The communication unit 11 includes a KM communication unit 111, a control communication unit 112, and an application communication unit 113. The KM communication unit 111 performs communication for sharing an encryption key (application key) with one or more KMs 10 in the key management layer of the QKDN. The control communication unit 112 performs communication for sharing information such as the mapping information with the QKDN control device 6 in the QKD network management layer. The application communication unit 113 performs communication for sharing, for example, ID information or information regarding an application key request with the applications 5 of the user network which is the uppermost service layer.

Note that the communication unit 11 may be implemented without being divided into the above three functional components.

The storage unit 12 is implemented by a storage medium such as a hard disk drive (HDD), an optical disk, a memory card, or a random access memory (RAM).

The storage unit 12 stores various types of information and the application key shared among KMs 10. The information stored in the storage unit 12 is ID information of the applications 5 in the user network, information of a key request, ID information of the destination KM from the QKDN control device 6, a key accumulation state with the destination KM, and others.

The processing unit 13 is implemented by at least one processing device and executes processing of the KM 10. This processing device includes, for example, a control device and an arithmetic device and is implemented by an analog or digital circuit or the like. The processing device may be a central processing unit (CPU) or may be a general-purpose processor, a microprocessor, a digital signal processor (DSP), an application specific integrated circuit (ASIC), a field-programmable gate array (FPGA), or a combination thereof.

The processing unit 13 includes an acquisition unit 131, an execution unit 132, a key processing unit 133, a provision unit 134, a control unit 135, a management unit 136, and a platform unit 137.

The acquisition unit 131 acquires information from the communication unit 11.

The execution unit 132 reads information from the storage unit 12 and executes processing in response to a key request from an application 5 in the user network. For example, the execution unit 132 calculates the amount of application keys corresponding to the destination KM 10 and executes key sharing processing in a case where the application keys are in short. In addition, for example, in a case where application keys that satisfy the requested amount are held in the storage unit 12, the execution unit 132 executes processing of transmitting the application key to the application 5.

The key processing unit 133 passes the application key to the provision unit 134 in accordance with the key request from the application 5. Specifically, the key processing unit 133 determines the requested amount of application keys, a provision time for transmitting the application key to the application 5, and a destination indicating a transmission destination of the application key in response to the request from the application 5.

When the application key is received from the key processing unit 133, the provision unit 134 transmits the application key to the application 5 on the user network in the service layer. For example, the provision unit 134 transmits the application key of the requested amount determined by the key processing unit 133 to the transmission destination determined by the key processing unit 133 by the provision time determined by the key processing unit 133. Note that the function of the provision unit 134 may be included in the communication unit 11.

The control unit 135 controls processing performed in the KM 10. For example, the control unit 135 controls activation and operation of each function of the KM 10.

The management unit 136 manages key resources such as the key generation rate or the key holding amount of a link connected to the KM 10.

The platform unit 137 provides operating system functions of a computer that are necessary for management and operation of functions on the KM 10, basic network functions, security functions, etc.

Exemplary Functional Configuration of QKDN Control Device

Figure 4:
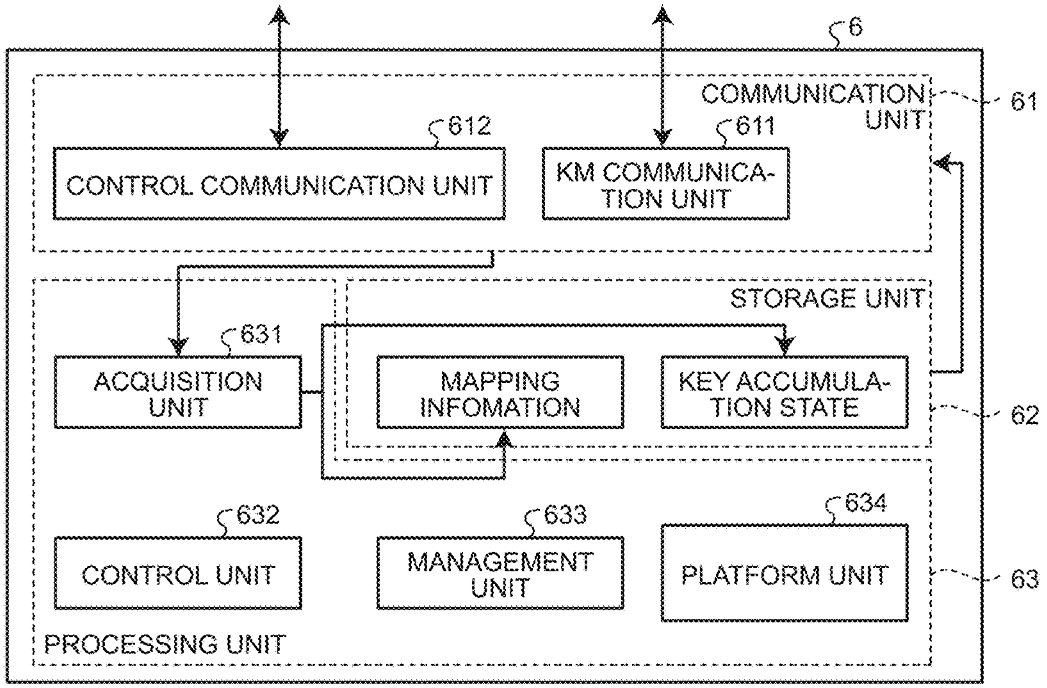
FIG. 4 is a diagram illustrating an example of a functional configuration of a QKDN control device according to the first embodiment.

FIG. 4 is a diagram illustrating an example of the functional configuration of the QKDN control device 6 of the first embodiment. The QKDN control device 6 of the first embodiment includes a communication unit 61, a storage unit 62, and a processing unit 63. Note that implementation methods by hardware of the communication unit 61, the storage unit 62, and the processing unit 63 are similar to those of the communication unit 11, the storage unit 12, and the processing unit 13 of the KM 10.

The QKDN control device 6 according to the first embodiment is connected to one or more KMs 10 that transmits an application key used for encrypting or decrypting communication between applications 5 in the user network to the applications 5.

The communication unit 61 includes a KM communication unit 611 and a control communication unit 612.

The KM communication unit 611 communicates with the one or more KMs 10 described above. For example, the KM communication unit 611 performs communication for sharing ID information of the KMs 10, ID information of applications connected to the KMs 10, the accumulation state of application keys with the destination KM 10, and others.

The control communication unit 612 performs communication for sharing information such as the mapping information and the key accumulation state between KMs 10 between QKDN control devices 6. In addition, in a case where the mapping information is centrally managed by an authoritative route server device, the control communication unit 612 communicates with the authoritative route server device.

Note that the communication unit 61 may be implemented without being divided into the above two components.

The storage unit 62 stores the mapping information and the key accumulation state. The mapping information includes, for example, the ID information of a KM 10 and the ID information of the application to which the application key is transmitted by the KM 10. Those pieces of ID information are correlated with each other in the mapping information. By using the mapping information, second identification information and third identification information can be specified. The second identification information is for identifying the destination application 5, and the third identification information is for identifying the KM 10 that transmits the application key to the destination application 5.

The key accumulation state indicates an accumulation state of application keys shared between KMs 10. For example, the key accumulation state indicates the amount of application keys already shared between the KM 10 connected to the source application 5 and the KM 10 connected to the destination application 5.

The processing unit 63 includes an acquisition unit 631, a control unit 632, a management unit 633, and a platform unit 634.

The acquisition unit 631 acquires information from the communication unit 61.

The control unit 632 controls processing performed in the QKDN control device 6. For example, the control unit 632 is responsible for control of activation and operation of each function. For example, the control unit 632 causes the communication unit 61 (an example of the communication interface) to acquire, from KMs 10, mapping information in which identification information for identifying the application 5 is correlated with identification information for identifying the KM 10 that transmits the application key to the application 5, and state information of the application key. The control unit 632 then stores the mapping information and the state information in the storage unit 62.

The management unit 633 manages information of the KMs 10 connected to the QKDN control device 6, the number of KMs 10, and others.

The platform unit 634 provides operating system functions of a computer that are necessary for management and operation of functions on the QKDN control device 6, basic network functions, security functions, etc.

Exemplary Functional Configuration of Information Processing Device

Figure 5:
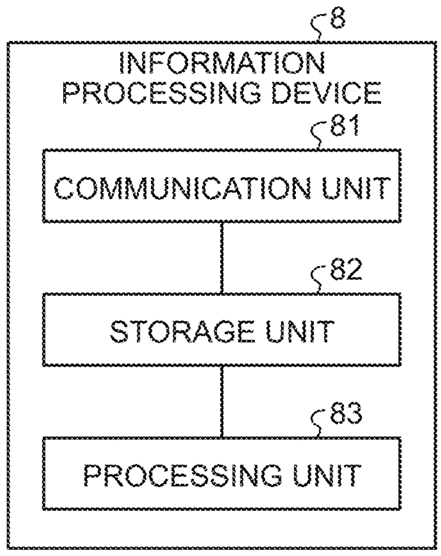
FIG. 5 is a diagram illustrating an example of a functional configuration of an information processing device according to the first embodiment.

FIG. 5 is a diagram illustrating an example of the functional configuration of the information processing device 8 according to the first embodiment. The information processing device 8 of the first embodiment includes a communication unit 81, a storage unit 82, and a processing unit 83. Note that implementation methods by hardware of the communication unit 81, the storage unit 82, and the processing unit 83 are similar to those of the communication unit 11, the storage unit 12, and the processing unit 13 of the KM 10.

The communication unit 81 transmits, by QKD, application key request information including first identification information for identifying a source application (for example, the application 5*a* of FIG. 1) of the user network, second identification information for identifying a destination application (for example, the application 5*c* in FIG. 1), and the requested amount of the application key used for encrypting or decrypting communication in the user network to a KM 10 connected to a QKD module 2 (an example of a QKD device) that generates a link key. In addition, the communication unit 81 receives the application key shared with a KM 10 to which the application key specified from the second identification information is shared in such a manner as to satisfy the requested amount.

The storage unit 82 stores, for example, an application key for each communication destination of an application 5.

The processing unit 83 causes the application 5 to operate and thereby encrypts communication in the user network.

Note that the configurations of the KM 10, the QKDN control device 6, and the information processing device 8 in the embodiment are merely examples, and modifications may be made to the configurations as appropriate.

Figure 6:
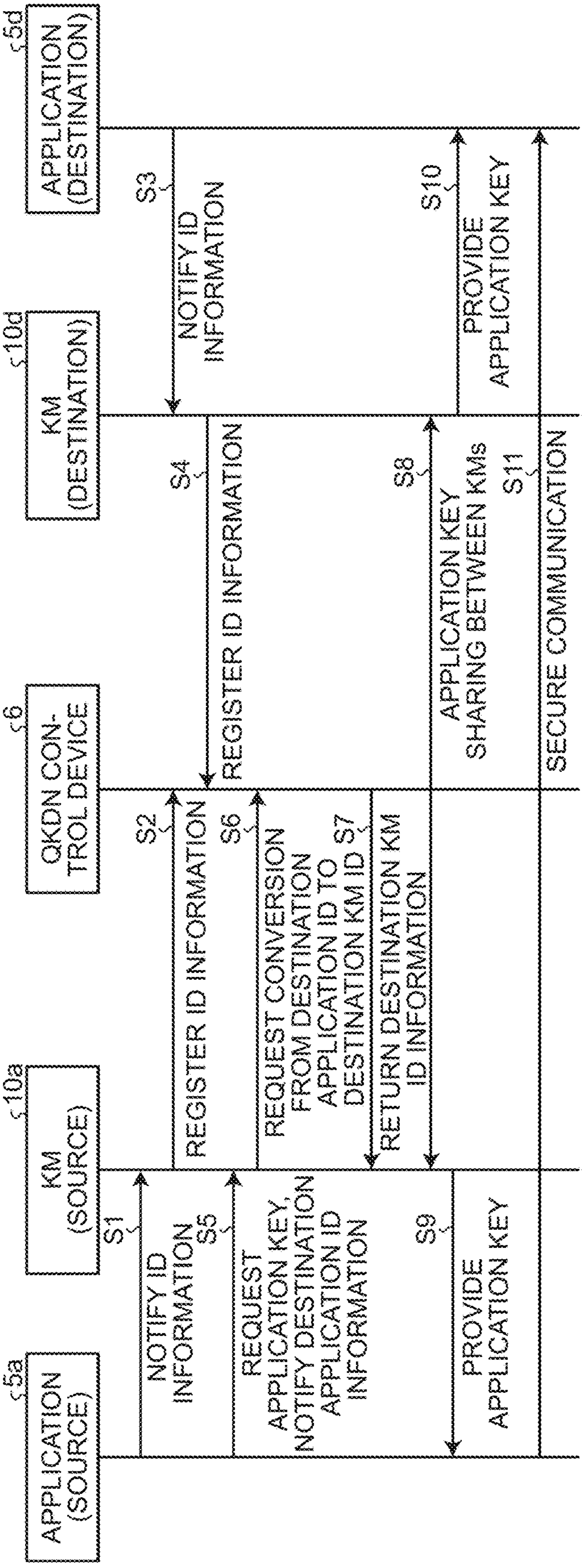
FIG. 6 is a sequence diagram illustrating an example of a secure communication method according to the first embodiment.

FIG. 6 is a sequence diagram illustrating an example of a secure communication method according to the first embodiment. The example of the secure communication method in FIG. 6 includes ID registration processing, ID conversion processing, and application key sharing and transmission processing.

First, when connecting the application (source) 5*a* to the KM (source) 10*a*, the application (source) 5*a* notifies the KM 10*a* of ID information (for example, the IP address or the like) of the application 5*a* (step S1). Next, the KM 10*a* registers the ID information of the application 5*a* notified in step S1 and the ID information of the KM 10*a* in the QKDN control device 6 (step S2).

Similarly, when connecting the application (destination) 5*d* to the KM (destination) 10*d*, the application (destination) 5*d* notifies the KM 10*d* of ID information (for example, the IP address or the like) of the application 5*d* (step S3). Next, the KM 10*d* registers the ID information of the application 5*d* notified in step S3 and the ID information of the KM 10*d* in the QKDN control device 6 (step S4).

The QKDN control device 6 generates the mapping information from the information registered in steps S2 and S4. The mapping information is centrally managed by the QKDN control device 6. Incidentally, the mapping information is periodically updated.

Before performing secure communication, the application 5*a* requests the KM 10*a* of the application key (step S5). At this point, the application 5*a* also notifies the KM 10*a* of information representing that the secure communication destination of the application 5*a* is the application 5*d* (for example, the ID information of the destination application 5*d*) and the requested amount of the application key.

Next, since the KM 10*a* does not have the information of the destination KM 10*d* connected to the application 5*d* which is the destination, the KM 10*a* requests the QKDN control device 6 to convert the ID information of the application 5*d* to obtain the ID information of the KM 10*d* (step S6).

Next, the QKDN control device 6 makes reference to the mapping information and notifies the KM 10*a* of the ID information of the KM 10*d* connected to the application 5*d* (step S7).

Then, the KMs 10*a* and 10*d* share the application key among the KM 10*a* to the KM 10*d* (step S8). Specifically, the KM 10*a* determines a sharing amount of the application key from the requested amount of the application key and shares the application key so as to satisfy the sharing amount by transmitting the application key encrypted with a link key to the KM 10*d*.

Next, the KMs 10*a* and 10*d* provide (transmit) the application key shared in step S8 to the applications 5*a* and 5*d* (steps S9 and S10).

The application 5*a* encrypts communication data using the application key provided in step S9 and transmits the encrypted communication data to the application 5*d* via the data communication network 103. Then, the application 5*d* decrypts the encrypted communication data received in step S11 with the application key provided in step S10 (same as the application key provided in step S9), thereby performing secure communication (step S11).

Note that, in the application key sharing processing performed in step S8, for example, the KM 10*a* accumulates link keys generated by the QKD module 2*a*. Then, the KM 10*a* encrypts the application key using a link key and relays the encrypted application key to the adjacent KM 10*b*. Similarly, the KM 10*b* relays the encrypted application key to the neighboring KM 10*c*, and the KM 10*c* relays the encrypted application key to the neighboring KM 10*d*.

Each KM 10 consumes the link key when encrypting the application key with the link key and exchanging the application key. That is, each KM 10 uses a link key of the one-time pad and discards the link key once used. In addition, each KM 10 determines a key relay route for sharing an application key with a desirable KM 10. Then, each KM 10 shares (transfers) the application key to the destination KM 10 while repeating encryption and decryption using a link key in each link following the determined route.

As described above, a node 1 in each base has the function of generating and sharing random numbers with a QKD module 2 on another side (the function of the QKD module 2) and the function of performing cryptographic communication on the key sharing network 102 using the generated random numbers as a link key (the function of the KM 10). The KM 10 may have a function of generating random numbers independently of the link key and a function of transmitting the random numbers generated independently of the link key to another node 1 (KM 10).

FIG. 7 is a table illustrating an example of mapping information according to the first embodiment. The mapping information indicates a correspondence between the ID information of applications and the ID information of KMs 10 to which the applications are connected. A KM 10 makes reference to the mapping information as illustrated in FIG. 7 when converting the ID information of an application 5 into the ID information of a KM 10.

The mapping information in FIG. 7 is an example of a case where the mapping information is managed by an IP-based table. The table includes the pair index number, the application ID, and the KM ID.

The pair index number is a number for identifying data of the table. The pair index number is, for example, a number that is automatically allocated when data is added to the table.

For example, in the case of the IP address, the application ID of an application D is 192.168.11.36 (IPv4) or 2001:db8:20:3:10:1c:11:8 (IPv6). As for the ID of a KM, for example, the ID of the KM 10*d* is 16.10.11.7 (IPv4).

The IP address of a KM 10 can be converted and generated in accordance with a given rule on the basis of the IP address of an application connected to the KM 10. The IP address of the KM 10 can also be designated by the QKDN control device 6. In general, in a case of adding a node 1 to the QKDN (in a case where a new KM 10 is added to the key sharing network 102), the ID of the KM 10 is often designated by the QKDN control device 6. Note that the QKDN is a private network and is not connected to a public network. Therefore, the IP address of a KM 10 of the QKDN can coincide with the IP address of the application 5 connected to the KM 10.

When connecting a KM 10 to the application 5, the KM 10 notifies the QKDN control device 6 of the ID information of the KM 10 and the ID information of the application 5. Upon receiving the information notified from the KM 10, the QKDN control device 6 adds the information to the mapping information. In addition, there are a case where the mapping information is updated only when there is a change and a case where the mapping information is periodically updated.

Note that, in the application 5, for example, the ID information such as the assigned IP address may change due to the influence of travelling of the information processing device 8 on which the application 5 operates. In this case, the application 5 may notify a newly connected KM 10 of the changed ID information, and the newly connected KM 10 may notify the QKDN control device 6 of the change of the mapping information. In addition, when the application 5 stops the service, KMs 10 connected to the application 5 may be notified that the service is to be stopped, and the KMs 10 may notify the QKDN control device 6 of deletion of mapping information of the application 5 for which the service is to be stopped.

Note that, with the QKDN control device 6 installed, the mapping information is integrally managed and periodically updated. An advantage of the integral management of the mapping information is that, even when the number of KMs 10 increases, the storage area for storing the mapping information of individual KMs 10 can be saved as compared with the case where each of the KMs 10 stores the mapping information. In addition, the problem of redundancy and duplication of the mapping information of the individual KMs 10 can also be improved. In addition, with the QKDN control device 6 installed, it is possible to efficiently respond to an inquiry about the mapping information.

As described above, the KM 10 of the first embodiment is a key manager connected to the QKD module 2 (an example of a QKD device) that generates a link key by QKD. The communication unit 11 (an example of the communication interface) receives, from the source application of the user network, the application key request information including the first identification information for identifying the source application, the second identification information for identifying the destination application, and the requested amount of the application key used for encrypting or decrypting communication in the user network. Then, the processing unit 13 identifies a key manager as a sharing destination of the application key from the second identification information, and determines the sharing amount of the application key from the requested amount of the application key. The processing unit 13 causes the communication unit 11 to transmit the application key that has been encrypted with a link key and satisfies the sharing amount to the key manager as the sharing destination. The processing unit 13 causes the communication unit 11 to transmit the application key of the requested amount to the source application identified by the first identification information.

Therefore, according to the first embodiment, regardless of the scale of the QKDN, the application 5 can be easily correlated with the key managers that transmit the encryption key to the application 5.

Second Embodiment

Next, a second embodiment will be described. In the description of the second embodiment, description similar to that of the first embodiment will be omitted, and portions different from those of the first embodiment will be described.

As the QDKN grows in size and also the number of KMs 10 increases, the key sharing network (KSN) 102 is generally divided into two or more KSN domains in order to efficiently and easily manage the KSN 102. In the KSN domain, for example, the number of KMs 10, the number of links between KMs 10, or the like is limited to within a given limit value (for example, 1000).

Figure 8A:
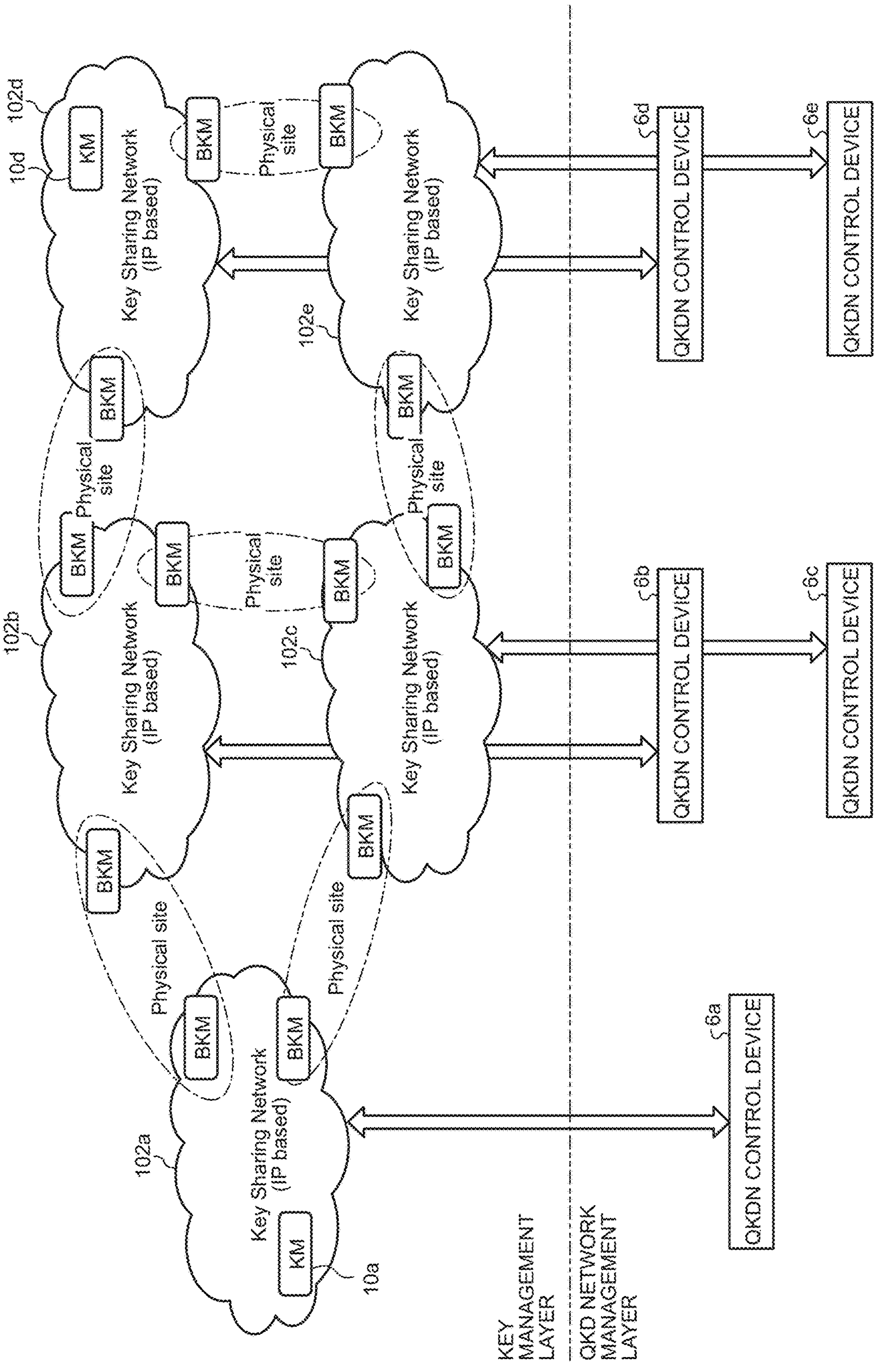
FIG. 8A is a diagram illustrating a first example of a KSN domain according to a second embodiment.

FIG. 8A is a diagram illustrating a first example of the KSN domain of the second embodiment. Illustrated in FIG. 8A is a case where there are five key sharing networks 102*a* to 102*e* of the same type (five KSN domains of the same type) (in the example of FIG. 8A, IP-based). Note that the number of key sharing networks 102 and the number of QKDN control devices 6 may be any number and are not limited to the example of FIG. 8A.

The five KSN domains illustrated in FIG. 8A have an IP-based ID system. Dedicated QKDN control devices 6*a* to 6*e* in the QKD network management layer are installed for the respective key sharing networks 102*a* to 102*e* in the key management layer.

The QKDN control devices 6 collect information such as the mapping information from KMs 10 of the respective key sharing networks 102 and manage the collected information.

The key sharing networks 102 are connected by KMs 10 each installed at an inter-domain border (hereinafter, referred to as a border KM (BKM)). The BKMs at the inter-domain border are located at physically the same location (node). Incidentally, information sharing between the BKMs does not depend on the QKD links 3 used for sharing the link key.

In a case where secure communication is performed from the application 5*a* (source) connected to the KM 10*a* in the key sharing network 102*a* to the application 5*d* (destination) connected to the KM 10*d* in the key sharing network 102*d*, there is no mapping information of the KM 10*d* in the QKDN control device 6*a*. Therefore, the mapping information of the KM 10*d* is desirably shared from the QKDN control device 6*d* to the QKDN control device 6*a*.

Note that each KSN domain is not limited to the same standards, the same scale, or the same quantum protocol. Moreover, the KSN domain (key sharing network 102) is not limited to an IP-based ID system. For example, IP-based key sharing networks 102 and non-IP-based key sharing networks 102 may be present together.

Figure 8B:
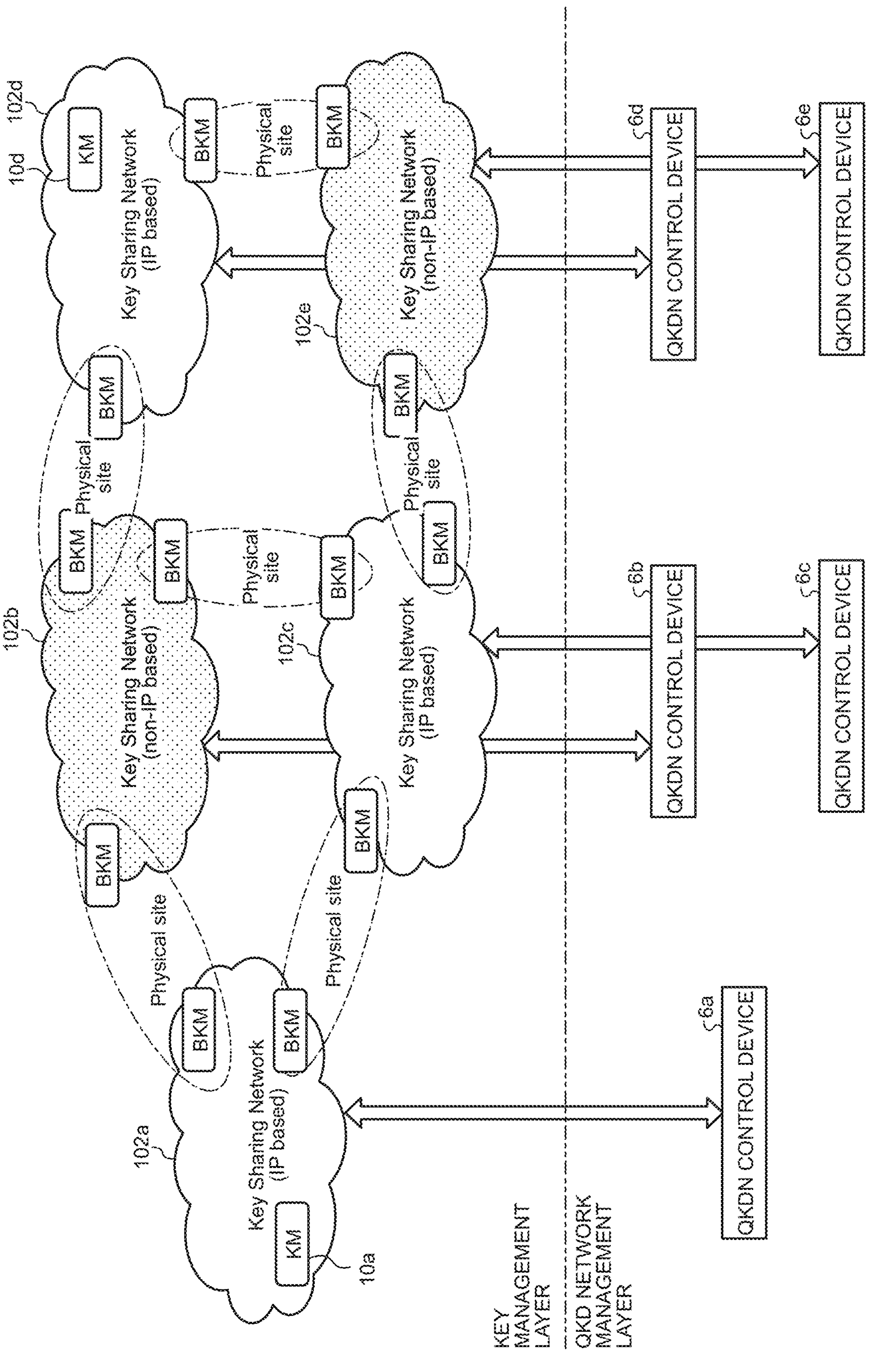
FIG. 8B is a diagram illustrating a second example of the KSN domain of the second embodiment.

FIG. 8B is a diagram illustrating a second example of the KSN domain of the second embodiment. Illustrated in FIG. 8B is an example in which different types of key sharing networks 102 are present together. In the example of FIG. 8B, there are five key sharing networks 102*a* to 102*e*. The key sharing networks 102*a*, 102*c*, and 102*d* are IP-based key sharing networks 102, and the key sharing networks 102*b* and 102*e* are non-IP-based key sharing networks 102. Note that the number of key sharing networks 102 and the number of QKDN control devices 6 may be any number and are not limited to the example of FIG. 8B.

In a case where different types of key sharing networks 102 are present together, it is desirable that the mapping information of the destination is efficiently shared.

FIG. 9 is a diagram illustrating an example of an ID system for identifying a KM 10 according to the second embodiment. As illustrated in FIG. 9, the ID system of a KM 10 generally includes a QKD identifier, a KSN identification number, and a KM identification number.

The QKD identifier identifies that it is a QKDN. The QKD identifier may further include an identifier for identifying the type of the QKDN.

The KSN identification number indicates an ID for identifying the key sharing network 102.

The KM identification number indicates an ID for identifying the KM 10.

The ID system of the KM 10 may follow, for example, an existing ID system. For example, according to the Internet Protocol (IP)-based ID system, the network part (including a subnet) is set to the QKD identifier and the KSN identification number, and the host part is set to the KM identification number. Note that either IPv4 (32 bits) or IPv6 (128 bits) may be used. An advantage of utilizing the IP-based ID system is that the protocol of the IP network can be utilized as it is and that routing for key relays between KMs 10 can be easily implemented.

Note that there are cases where the KSN identification numbers are different, but the KM identification numbers are the same. Therefore, a system for identifying a KM 10 by combining the KSN identification number and the KM identification number is also referred to as a tree type.

Moreover, for example, the ID system of the KMs 10 may follow to the universally unique identifier (UUID)-based ID system (128 bits). In the case of following the UUID, it is possible to use only the media access control address (MAC) address-based ID system (48 bits) without using the timestamp (60 bits) or the clock sequence (14 bits). The organizationally unique identifier (OUI) (24 bits) part in the ID system (48 bits) is uniquely assigned as the QKD identifier and the KSN identification number in such a manner as to avoid redundancy. The remaining OUI (24 bits) part is assigned to the KM identification number. Since the identification numbers of KMs are not duplicated, such a system is also referred to as a distributed type.

Meanwhile, other original ID systems are also possible as the ID system of the KMs 10. An original ID system is only required to include at least the KSN identification number and the KM identification number, and it is sufficient that a key relay based on the original ID system can be implemented inside the key sharing network 102.

Figure 10:
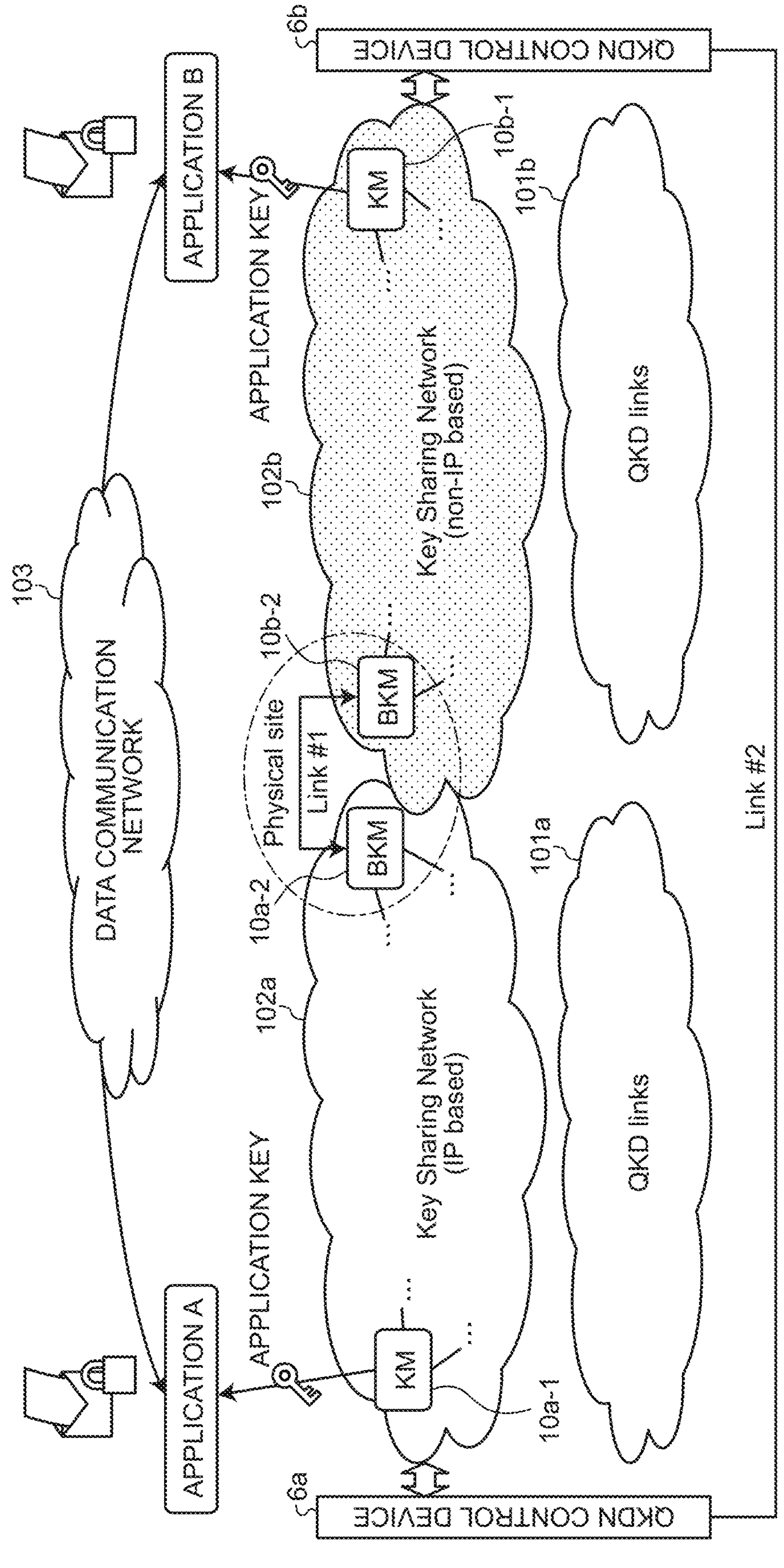
FIG. 10 is a diagram illustrating an example of a quantum cryptographic communication network according to the second embodiment.

FIG. 10 is a diagram illustrating an example of a quantum cryptographic communication network according to the second embodiment. The example of FIG. 10 illustrates a case of a QKDN including different types of key sharing networks 102*a* and 102*b*. The application A and the application B perform secure communication via a data communication network 103. An application A connects to a KM 10*a*-1 in the key sharing network 102*a*. An application B connects to a KM 10*b*-1 in the key sharing network 102*b*.

The key sharing networks 102*a* and 102*b* are connected by Link #1 between a BKM 10*a*-2 and a BKM 10*b*-2 which are physically located at the same location. Link #1 does not depend on a network 101*a* or 101*b* of a QKD link 3.

QKDN control devices 6*a* and 6*b* are installed in the key sharing networks 102*a* and 102*b*, respectively, and the QKDN control devices 6*a* and 6*b* are connected by a separate link (Link #2).

For Link #2, the networks 101*a* and 101*b* of the QKD link 3 may be used, or an ordinary link protected by a scheme other than QKD may be used. Note that there is a case where no Link #2 is present. In a case where Link #2 is not present, it is also conceivable to share information via Link #1 between the BKMs 10*a*-2 and 10*b*-2.

Note that, in the example of FIG. 10, KMs 10 in the key sharing networks 102 and QKD modules 2 in the networks 101*a* and 101*b* of the QKD link 3 are omitted for the sake of simplicity.

Figure 11:
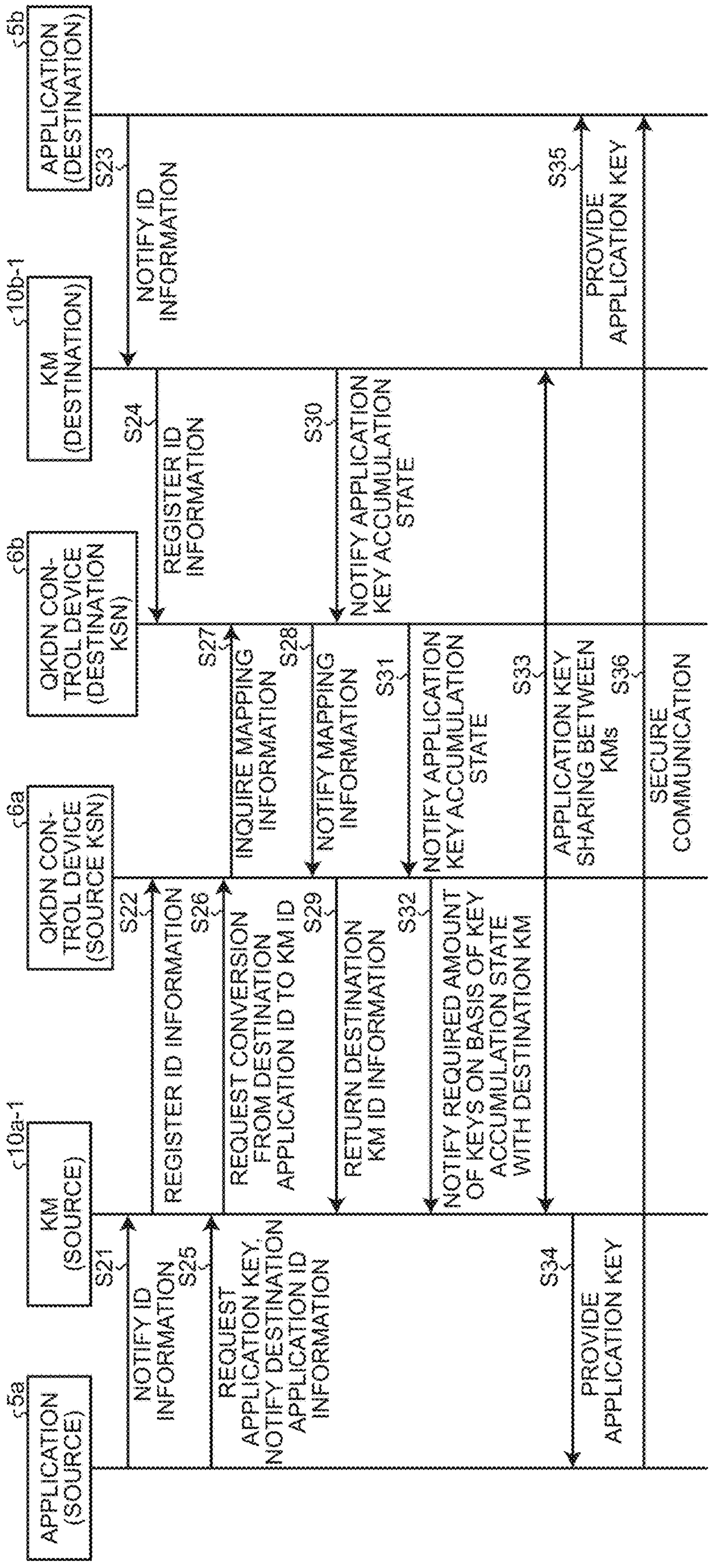
FIG. 11 is a sequence diagram illustrating an example of a secure communication method according to the second embodiment.

FIG. 11 is a sequence diagram illustrating an example of a secure communication method according to the second embodiment. The example of FIG. 11 illustrates a sequence of relaying and transmitting an application key on the basis of the mapping information and the key accumulation state in the configuration of FIG. 10. An application 5*a* (source) corresponds to the application A in FIG. 10. An application 5*b* (destination) corresponds to the application B in FIG. 10.

First, when connecting the application 5*a* to the KM 10*a*-1, the application 5*a* notifies the KM 10*a*-1 of the ID information of the application 5*a* (step S21). Next, the KM 10*a*-1 registers the ID information of the application 5*a* notified in step S21 and the ID information of the KM 10*a*-1 in the table of mapping information stored in the QKDN control device 6*a* (step S22).

Similarly, when connecting the application 5*b* to the KM 10*b*-1, the application 5*b* notifies the KM 10*b*-1 of the ID information of the application 5*b* (step S23) and registers the ID information of the application 5*b* and the ID information of the KM 10*b*-1 in the table of mapping information of the QKDN control device 6*b* (step S24).

Before performing secure communication, the application 5*a* requests the KM 10*a*-1 for the application key (step S25). At this point, the application 5*a* notifies the KM 10*a*-1 of information representing that the secure communication destination of the application 5*a* is the application 5*b* (for example, ID information of the destination application 5*b*) and the requested amount of the application key.

Next, the KM 10*a*-1 requests the QKDN control device 6*a* to convert the ID of the application 5*b* into the ID of the KM 10 connected to the application 5*b* (step S26).

Next, the QKDN control device 6*a* makes reference to the table of mapping information and searches for the KM 10 to which the application 5*b* is connected. In a case where the information of the KM 10 to which the application 5*b* is connected is not found, the QKDN control device 6*a* inquires of the QKDN control device 6*b* about the ID information of the KM 10 to which the application 5*b* is connected (step S27). The QKDN control device 6*b* makes reference to the table of mapping information and identifies that the KM 10 to which the application 5*b* is connected is the KM 10*b*-1 and the ID information of the KM 10*b*-1.

Upon receiving the mapping information representing that the KM 10 to which the application 5*b* is connected is the KM 10*b*-1 from the QKDN control device 6*b* (step S28), the QKDN control device 6*a* returns the ID information of the KM 10*b*-1 to the KM 10*a*-1 (step S29).

The QKDN control device 6*b* inquires of the KM 10*b*-1 about the application key accumulation state shared with the KM 10*a*-1. Upon receiving the application key accumulation state (step S30), the QKDN control device 6*b* notifies the QKDN control device 6*a* of the application key accumulation state (step S31).

Next, the QKDN control device 6*a* updates the mapping information and the key accumulation state stored in the storage unit 62 of the QKDN control device 6*a* on the basis of the mapping information notified in step S27 and the application key accumulation information notified in step S30. The QKDN control device 6*a* calculates the required amount (sharing amount) of the application key to be additionally required from the requested amount of the application key and the application key accumulation state shared between the KM 10*a*-1 and the KM 10*b*-1 and notifies the KM 10*a*-1 of the required amount of the application key (step S32).

Next, in a case where the required amount of the application key to be additionally required is not zero (when the application key accumulation amount is smaller than the requested amount of the application key), the KM 10*a*-1 performs key relay of the application key from the KM 10*a*-1 to the KM 10*b*-1 to share the application key (step S33).

After the application key is shared, the KMs 10*a*-1 and 10*b*-1 provide (transmit) the application key to the applications 5*a* and 5*b* (steps S34 and S35).

Since the secure communication in step S36 is the same as the secure communication (FIG. 6) in step S11 of the first embodiment, description thereof will be omitted.

Note that, in step S31 described above, in a case where the required amount of the application key to be additionally required is zero (in a case where the application key accumulation amount is larger than or equal to the requested amount of the application key), the KM 10*a*-1 immediately provides the application key from the KM 10*a*-1 to the application 5*a*. In addition, the KM 10*a*-1 transmits an instruction to immediately provide the application key to the application 5*b* to the KM 10*b*-1.

In addition, the required amount (sharing amount) of the application key to be additionally required may be calculated by the processing unit 13 of the KM 10. In this case, the communication unit 11 of the KM 10 receives the state information of the application key from the QKDN control device 6*a*, and the processing unit 13 determines the sharing amount of the application key from the requested amount and the state information of the application key.

FIG. 12 is a table illustrating an example of mapping information according to the second embodiment. FIG. 12 is an example of a table of mapping information shared between the QKDN control devices 6*a* and 6*b*. The table in FIG. 12 indicates a table stored in the QKDN control device 6*a*. As compared with FIG. 7 of the first embodiment, the type and the KSN ID are added.

There are two types of "i" and "o". Type "i" indicates inside information and indicates that the ID information is collected from KMs 10 inside a corresponding KSN domain. Type "o" indicates outside information and indicates ID information shared by another QKDN control device 6 (ID information of a KM 10 belonging to another KSN domain).

The KSN ID is, for example, an identification number of the KSN. As the KM ID, only the identification number of the KM 10 may be registered alone, or an ID obtained by combining the identification number of the KSN and the identification number of the KM may be used.

In the example of FIG. 12, the KM 10*a*-1 has the IP-based ID system, and the KM 10*b*-1 has a non-IP-based ID system. The application ID (for example, the IP address) is assigned from the data communication network 103 to which the application 5 belongs. A plurality of applications 5 may connect to the same KM 10. Conversely, one application 5 does not connect to a plurality of KMs 10.

In the table of mapping information of FIG. 12, the information from each KM 10 in the KSN domain is periodically (regularly) updated. The period is set depending on the actual situation. The data stored in the table of mapping information is added, deleted, or updated also when a new application is connected to a KM 10, when a KM 10 disconnects from an application 5, or when an application key is requested from an application 5.

FIG. 13 is a table illustrating an example of state information of the second embodiment. FIG. 13 illustrates an example of a table of state information shared between the QKDN control devices 6*a* and 6*b*. The table of FIG. 13 indicates a table stored in the QKDN control device 6*a*. The table of FIG. 13 includes the type, the sequence number, the source KM ID, the destination KM ID, the encryption application key, and the decryption application key.

The description of the type is similar to the description of FIG. 12, so that description thereof will be omitted.

The sequence information is identification information assigned in the order of storing the data. The sequence number is, for example, numbers assigned in the order of time. The source KM ID is identification information for identifying the source KM 10. The destination KM ID is identification information for identifying the destination KM 10. The encryption application key and the decryption application key information indicate the remaining amount of the currently accumulated application keys.

The example of the data of the first row and the data of the third row in FIG. 13 illustrates a case where the sequence numbers coincide with each other since the accumulation state of the application key has been shared. In this case, the remaining amount of the encryption application key of the KM 10*a*-1 coincides with the remaining amount of the decryption application key of the KM 10*b*-1. In addition, the remaining amount of the decryption application key of the KM 10*a*-1 also coincides with the remaining amount of the encryption application key of the KM 10*b*-1.

The example of the data of the second row and the data of the fourth row in FIG. 13 indicates a case where the accumulation state of the application key has not been shared for a while, and thus the sequence numbers do not coincide with each other. The accumulation state of the application key of the KM 10*a*-1 belonging to the KSN domain managed by the QKDN control device 6*a* is new, and the accumulation state of the application key shared by another QKDN control device 6 managing the KSN domain to which KM 10*b*-*x* belongs is old. Therefore, the encryption application key of the KM 10*a*-1 and the decryption application key of the KM 10*b*-*x* do not coincide with each other.

In the table of state information of the application key, the accumulation states of application keys of KMs 10 in the KSN domain managed by a QKDN control device 6 may be periodically (regularly) updated or may not be periodically updated. The period is set depending on the actual situation. In addition, when an application key is requested from an application 5, the accumulation state of the application key may be updated.

Note that, since a node 1 (a QKD module 2 and a KM 10) has been added to the QKDN, the link key between QKD modules 2 is continuously generated at a given rate without interruption. The generated link key is accumulated in the KM 10 and used as an encryption key and a decryption key when the application key is shared. Secure communication between applications 5 occurs depending on needs, and an application key is shared between KMs 10 in response to an application key request from an application 5.

Alternatively, an accumulated application key may be used in advance. That is, each KM 10 may share a given amount of application keys in advance regardless of presence of an application key request. As a result, in a case where the amount of application key to be requested is less than or equal to the accumulation amount (current accumulation amount) of the application key that has been shared in advance, the source KM 10 and the destination KM 10 can transmit the application key to the application 5 without performing new application key sharing processing.

Contrarily, in a case where the amount of application key to be requested is larger than the accumulation amount of the application key that has been shared in advance, the QKDN control device 6 or the KM 10 notified of the application key accumulation state from the QKDN control device 6 calculates the amount of application key that will be additionally required and performs the application key sharing processing as necessary. With the plurality of QKDN control devices 6 sharing the application key accumulation state as illustrated in FIG. 13, the application key can be transmitted to an application 5 flexibly and efficiently.

Figure 14:
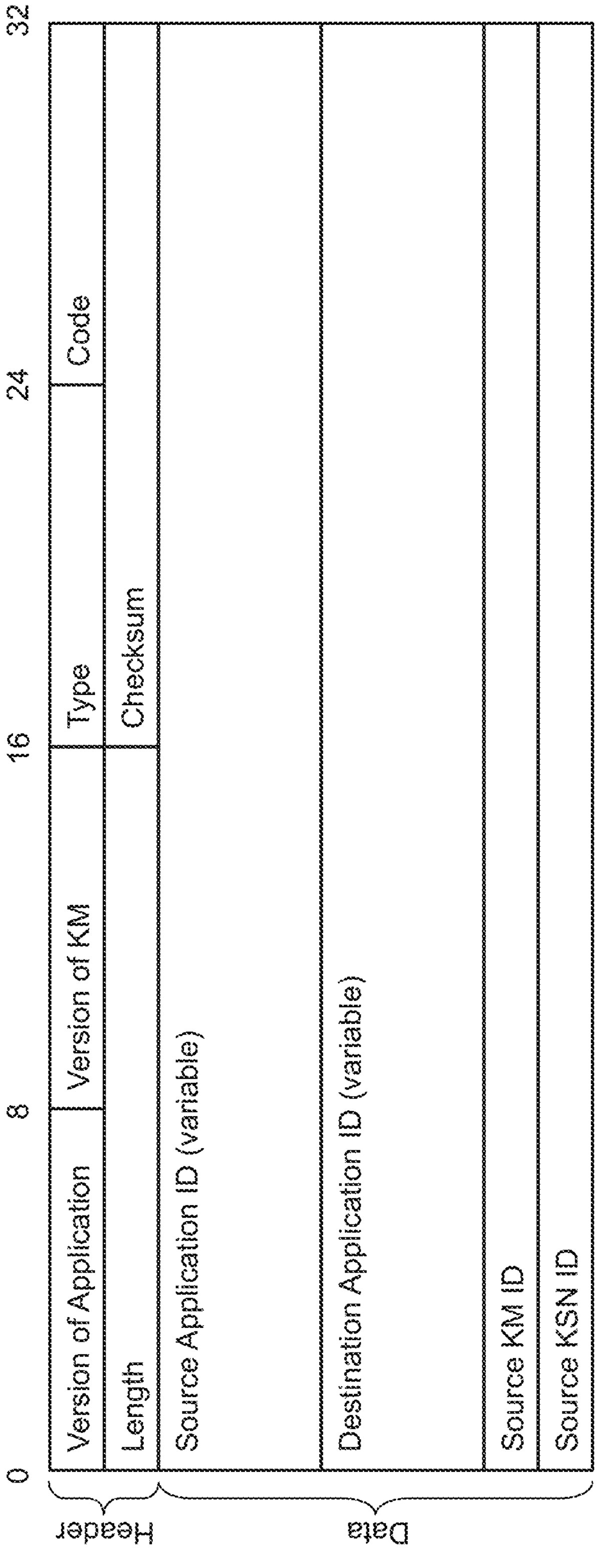
FIG. 14 is a diagram illustrating an example of a format of a query message regarding sharing of mapping information according to the second embodiment.

FIG. 14 is a diagram illustrating an example of a format of a query message regarding sharing of mapping information according to the second embodiment. A header part of the query message includes six fields.

Version of Application is a field indicating the version of the application 5. For example, in the case of IPv4, 0x04 is stored in Version of Application. For example, in the case of IPv6, 0x06 is stored in Version of Application. Moreover, for example, in the case of non-IP, 0x10 is stored in Version of Application.

Version of KM is a field indicating the version of the KM 10. For example, in the case of IPv4, 0x04 is stored in Version of KM. Alternatively, for example, in the case of IPv6, 0x06 is stored in Version of KM. For example, in the case of non-IP, 0x10 is stored in Version of KM.

Type is a field indicating the type of the message. For example, in the case of an inquiry, 0x00 is stored in Type. Moreover, for example, in the case of a response, 0x10 is stored in Type. Alternatively, for example, in the case of an error, 0x20 is stored in Type.

Code is a field indicating the purpose of the message. For example, in the case of Type=0x00 (in the case of an inquiry), 0x01 is stored in Code in the case of an inquiry of the ID of the KSN domain. Alternatively, for example, in the case of an inquiry about the ID of the KM 10, 0x02 is stored in Code. Further alternatively, for example, in the case of an inquiry of a sequence number, 0x03 is stored in Code. Moreover, for example, in the case of an inquiry about an application key, 0x04 is stored in Code.

Similarly, for example, in the case of Type=0x10 (in the case of a response), 0x11 is stored in Code in the case of a response of the ID of the KSN domain. Alternatively, for example, in the case of a response of the ID of the KM 10, 0x12 is stored in Code. Further alternatively, for example, in the case of a response of a sequence number, 0x13 is stored in Code. Moreover, for example, in the case of a response of an application key, 0x14 is stored in Code.

Moreover, for example, in the case of Type=0x20 (in the case of an error), in the case where the ID of the KSN domain is unknown, 0x21 is stored in Code. Alternatively, for example, in the case where the ID of the KM 10 is unknown, 0x22 is stored in Code. Further alternatively, for example, in the case of an error in the sequence number, 0x23 is stored in Code. Moreover, for example, in the case of an error in the application key, 0x24 is stored in Code.

Length is a field indicating the length of the message.

Checksum is a field for an error check of a message.

The data part of the query message includes four fields.

Source Application ID is a field indicating information of the source application 5. For example, the length of Source Application ID is 32 bits in the case of IPv4, and the length of Source Application ID is 128 bits in the case of IPv6.

Destination Application ID is a field indicating information of the destination application 5. For example, the length of Destination Application ID is 32 bits in the case of IPv4, and the length of Destination Application ID is 128 bits in the case of IPv6.

Source KM ID is a field indicating information of the source KM 10.

Source KSN ID is a field indicating information of the KSN domain to which the source KM 10 belongs.

Figure 15:
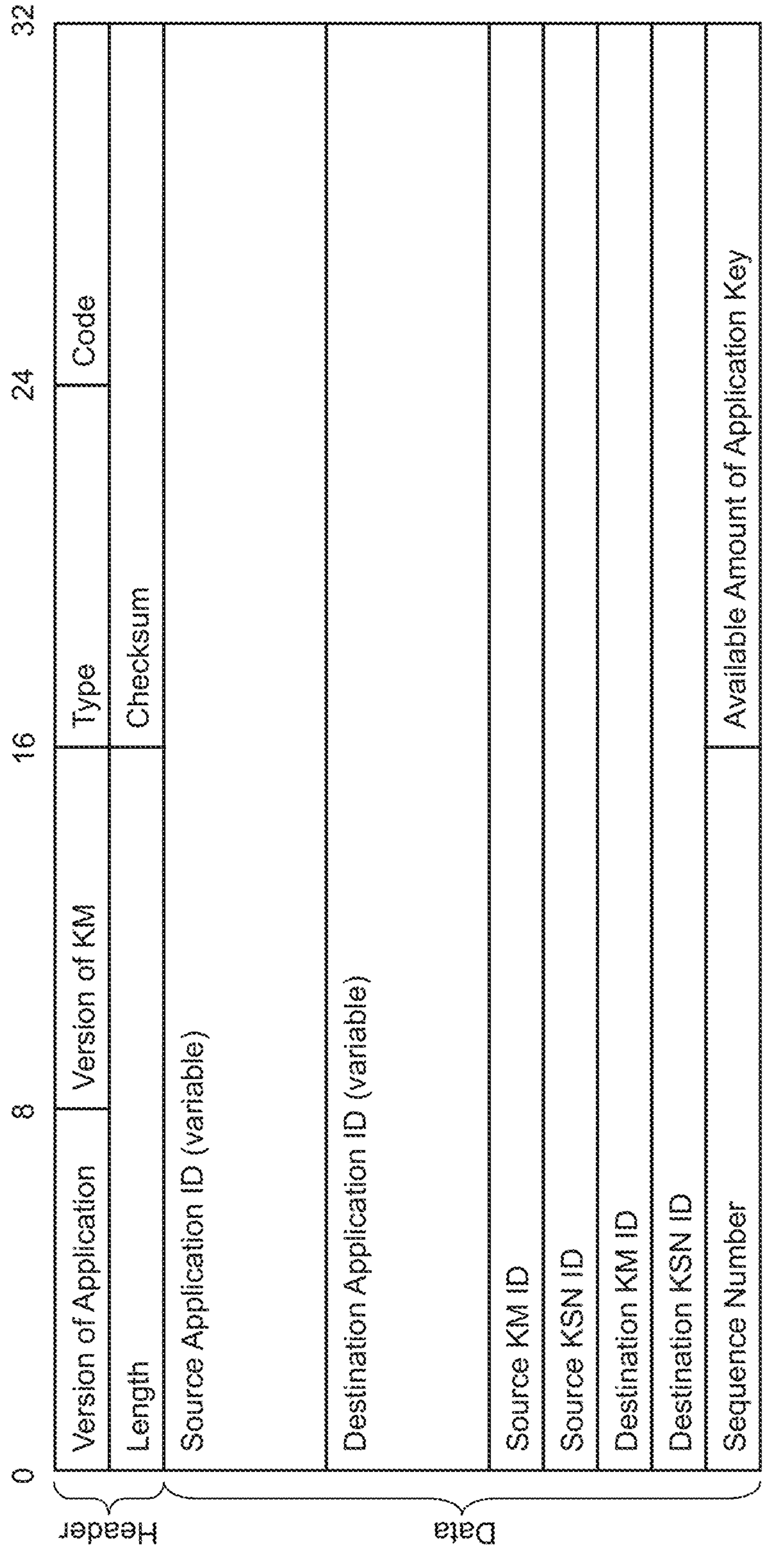
FIG. 15 is a diagram illustrating an example of a format of a response message regarding sharing of mapping information according to the second embodiment.

FIG. 15 is a diagram illustrating an example of a format of a response message regarding sharing of the mapping information of the second embodiment. The header part of the response message includes six fields. The header part of the response message is the same as the header part of the query format.

The data part of the response message includes eight fields. The first four fields are consistent with the data part of the query message. In the data part of the response message, two fields for the mapping information and two fields for the accumulation state of the application key are added.

Destination KM ID is a field indicating ID information of the destination KM 10.

Destination KSN ID is a field indicating ID information of the destination KSN domain.

Sequence Number is a field indicating the sequence number.

Available Amount of Application Key is a field indicating the accumulation state of the application key already shared between the source KM 10 and the destination KM 10.

Note that the field length of the message is defined depending on the actual requirement. The field lengths of the messages illustrated in FIGS. 12 and 13 are examples.

In the configuration examples of FIGS. 8A and 8B, for example, the operation at the time when an application key is requested from the application 5 connected to the KM 10*a* in the key sharing network 102*a* and secure communication is performed with the application connected to the KM 10*d* in the key sharing network 102*d* is basically the same as that in FIG. 10. However, since information sharing among the QKDN control devices 6*a* to 6*d* is not connected by one link, it is slightly complicated.

As a form for sharing information among the QKDN control devices 6*a* to 6*d*, there are a form of sharing by distributed management and a form of sharing by centralized management. In the distributed management, a dedicated network for QKDN control devices 6 is configured. In the centralized management, an authoritative route server device is installed, and all the QKDN control devices 6 are connected to the authoritative route server device.

Figure 16:
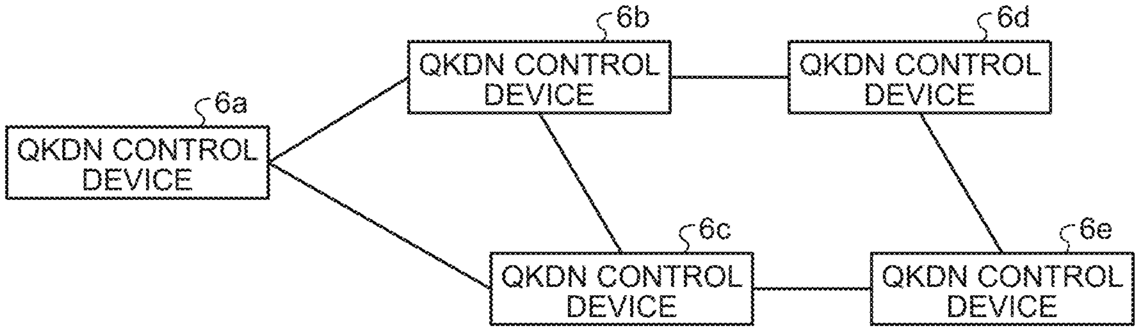
FIG. 16 is a diagram illustrating an example of the configuration of distributed management according to the second embodiment.

FIG. 16 is a diagram illustrating an example of the configuration of distributed management according to the second embodiment. In the example of FIG. 16, QKDN control devices 6 constitute a dedicated network, and each of the QKDN control devices 6 stores the mapping information and the state information of the application key. Each of the QKDN control devices 6 also creates, updates, and deletes the mapping information and the state information of the application key.

When an application key is requested from an application 5 in the user network, related information (for example, mapping information and the state information of the application key) is shared among the QKDN control devices 6.

A QKDN control device 6 simultaneously forwards the same query message to the other QKDN control devices 6 in the dedicated network, for example, in a broadcast manner in order to find information of the destination.

The other QKDN control devices 6 receive the query message and make reference to the field of Destination Application ID. Then, each of those devices 6 checks the mapping information and returns a response message.

When the response messages arrive from the other QKDN control devices 6, the QKDN control device 6 that has transmitted the query message checks the fields of Type and Code. In the case of an error as a result of checking the fields of Type and Code, the QKDN control device 6 determines that secure communication between the applications 5 is impossible since there is no related information of the destination application 5. Alternatively, in a case where it is not an error as a result of checking the fields of Type and Code, the QKDN control device 6 performs key transmission and key relay processing on the basis of the four pieces of field information from Destination KM ID field.

In the example of FIG. 16, for distributed management, a sequence number (for example, in the order of time) is assigned to related information, and the most recent information is always used. Note that the link between the QKDN control devices 6 may be the QKD link 3 or an ordinary link protected by a scheme other than QKD.

Figure 17:
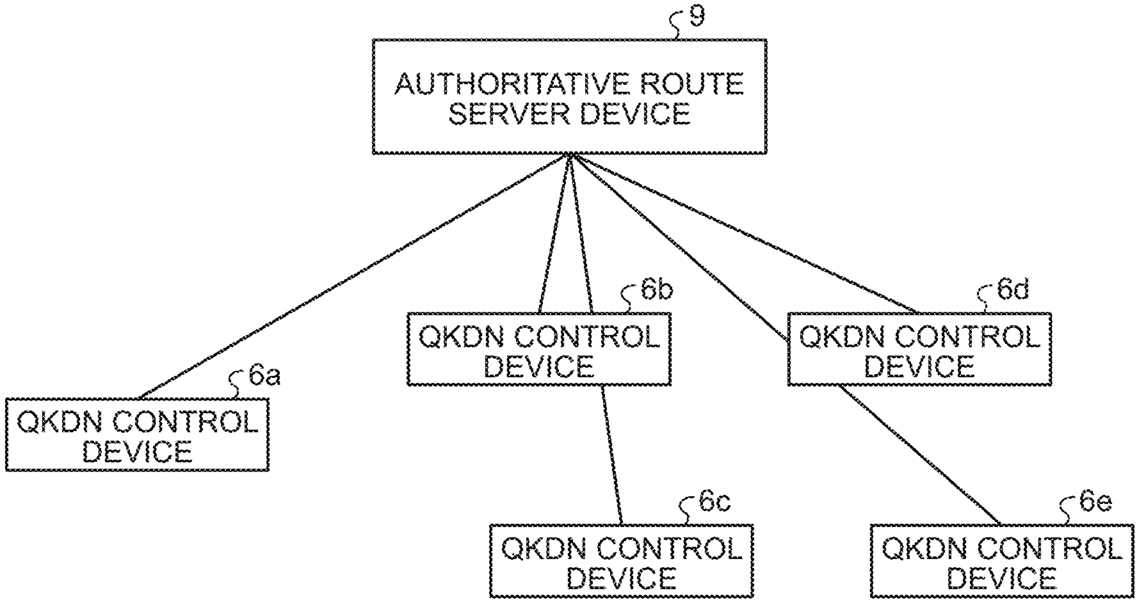
FIG. 17 is a diagram illustrating an example of the configuration of centralized management according to the second embodiment.

FIG. 17 is a diagram illustrating an example of the configuration of centralized management according to the second embodiment. In the example of FIG. 17, the QKDN control devices 6 are connected to an authoritative route server device 9. The related information such as the mapping information and the state information of the application key is integrally managed by the authoritative route server device 9. When an application key is requested from the application 5 in the user network, a QKDN control device 6 inquires of the authoritative route server device 9 for related information. In a case where it is not an error as a result of checking the fields of Type and Code included in a response message received from the authoritative route server device 9, the QKDN control device 6 performs key transmission and key relay processing on the basis of the mapping information and the state information of the application key.

In the case of an error as a result of checking the fields of Type and Code included in the response message received from the authoritative route server device 9, the QKDN control device 6 feeds back to the KM 10 that secure communication between the applications 5 is not possible since there is no related information of the destination application 5.

Regarding information update of the authoritative route server device 9, in a case where the information is constantly updated, a sequence number is assigned that matches for the authoritative route server device 9 and the QKDN control devices 6. In a case where the information of the authoritative route server device 9 is updated only when inquiring the mapping information and the state information of the application key, related QKDN control devices 6 notify the authoritative route server device 9 of the most recent information when there is an inquiry.

Note that links between the authoritative route server device 9 and the QKDN control devices 6 may be the QKD link 3 or may be an ordinary link protected by a scheme other than QKD.

An example of the hardware configuration of the KM 10, the QKDN control device 6, and the information processing device 8 according to the present embodiment will be described.

Exemplary Hardware Configuration

Figure 18:
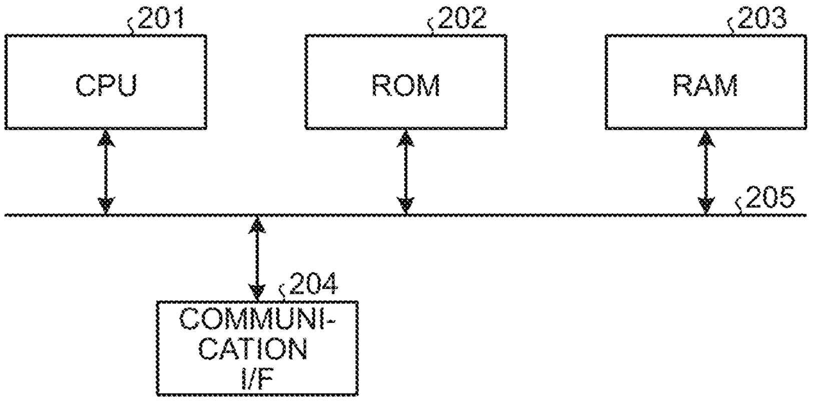
FIG. 18 is a diagram illustrating an example of the hardware configuration of a KM, a QKDN control device, and an information processing device according to the first and second embodiments.

FIG. 18 is a diagram illustrating an example of the hardware configuration of the KM 10, the QKDN control device 6, and the information processing device 8 according to the first and second embodiments. The KM 10, the QKDN control device 6, and the information processing device 8 include a control device such as a CPU 201, a storage device such as a read only memory (ROM) 202 and a RAM 203, and a communication I/F 204 that is connected to a network and performs communication. The CPU 201, the ROM 202, the RAM 203, and the communication I/F 204 are connected by a bus 205.

For example, computer programs executed by the KM 10, the QKDN control device 6, and the information processing device 8 are provided by being incorporated in the ROM 202 or the like in advance.

Moreover, for example, the computer programs executed by the KM 10, the QKDN control device 6, and the information processing device 8 may be provided as a computer program product by being recorded in a computer-readable recording medium such as a compact disk read only memory (CD-ROM), a flexible disk (FD), a compact disk recordable (CD-R), or a digital versatile disk (DVD) as a file in an installable format or an executable format.

Alternatively, the computer programs executed by the KM 10, the QKDN control device 6, and the information processing device 8 may be provided by being stored in a computer connected to a network such as the Internet and allowing download via the network. Alternatively, the computer programs executed by the KM 10, the QKDN control device 6, and the information processing device 8 may be provided or distributed via a network such as the Internet.

The computer programs executed by the KM 10, the QKDN control device 6, and the information processing device 8 can cause a computer to function as components of the KM 10, the QKDN control device 6, and the information processing device 8 described above. In this computer, the CPU 201 can read the computer programs from a computer-readable storage medium onto a main storage device such as the RAM 203 and execute the computer programs.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A key manager connected to a quantum key distribution (QKD) device generating a link key by QKD, the key manager comprising:
- a communication interface configured to receive, from a source application of a user network, request information of an application key including first identification information for identifying the source application, second identification information for identifying a destination application, and a requested amount of the application key used for encrypting or decrypting communication in the user network; and
- a processor configured to
  - identify a key manager as a sharing destination of the application key from the second identification information,
  - determine a sharing amount of the application key from the requested amount of the application key and state information representing an amount of application keys already shared between a key manager connected to the source application and a key manager connected to the destination application,
  - cause the communication interface to transmit the application key to the key manager as the sharing destination, the application key to be transmitted having been encrypted by using the link key and satisfying the sharing amount, and
  - cause the communication interface to transmit the application key of the requested amount to the source application identified by the first identification information, wherein
- the communication interface is configured to:
  - communicate with a quantum key distribution network (QKDN) control device in which mapping information is stored, the mapping information including the second identification information and third identification information correlated with each other, the third identification information being used for identifying a key manager transmitting the application key to the destination application, and
  - acquire the mapping information from the QKDN control device, and
- the processor is configured to identify the key manager as the sharing destination of the application key from the mapping information.

2. The key manager according to claim 1, wherein
- the request information of the application key further includes a provision time at which the application key is to be transmitted, and
- the communication interface is configured to transmit the application key of the requested amount to the source application by the provision time.

3. The key manager according to claim 1, wherein
- the QKDN control device further stores the state information.

4. A quantum cryptographic communication system comprising:
- a first key manager and a second key manager, each being a key manager connected to a quantum key distribution (QKD) device generating a link key by QKD, the key manager comprising:
  - a communication interface configured to receive, from a source application of a user network, request information of an application key including first identification information for identifying the source application, second identification information for identifying a destination application, and a requested amount of the application key used for encrypting or decrypting communication in the user network; and a processor configured to identify a key manager as a sharing destination of the application key from the second identification information, determine a sharing amount of the application key from the requested amount of the application key, cause the communication interface to transmit the application key to the key manager as the sharing destination, the application key to be transmitted having been encrypted by using the link key and satisfying the sharing amount, and cause the communication interface to transmit the application key of the requested amount to the source application identified by the first identification information, wherein the communication interface is configured to communicate with a quantum key distribution network (QKDN) control device in which mapping information is stored, the mapping information including the second identification information and third identification information correlated with each other, the third identification information being used for identifying a key manager transmitting the application key to the destination application, and acquire the mapping information from the QKDN control device, and the processor is configured to identify the key manager as the sharing destination of the application key from the mapping information;

a key sharing network including the first key manager and the second key manager;

the QKDN control device configured to communicate with the first key manager and the second key manager;

a plurality of applications including the source application and the destination application; and the user network in which the applications performs cryptographic communication using the application key.

5. The quantum cryptographic communication system according to claim 4, further comprising a first QKD device and a second QKD device, each being the QKD device generating the link key by QKD, wherein the first QKD device is configured to transmit the link key to the first key manager, and the second QKD device is configured to transmit the link key to the second key manager.

6. An information processing device comprising:

a communication interface configured to transmit request information of an application key to a first key manager connected to a quantum key distribution (QKD) device generating a link key by QKD, the request information including first identification information for identifying a source application of a user network, second identification information for identifying a destination application, and a requested amount of an application key used for encrypting or decrypting communication in the user network, and receive an application key shared with a second key manager to which the application key identified from the second identification information is shared such that the requested amount is satisfied; and a processor configured to encrypt communication in the user network by causing the source application to operate, wherein the mapping information is acquired by the first key manager communicating with a quantum key distribution network (QKDN) control device storing the mapping information including the second identification information and third identification information correlated with each other, the third identification information being used for identifying the second key manager transmitting the application key to the destination application, the second key manager as the sharing destination of the application key is identified from the mapping information, and a sharing amount of the application key is determined from the requested amount of the application key and state information representing an amount of application keys already shared between the first key manager connected to the source application and the second key manager connected to the destination application.

7. A key management method implemented by a computer as a key manager connected to a quantum key distribution (QKD) device generating a link key by QKD, the key management method comprising:

receiving, from a source application of a user network, request information of an application key including first identification information for identifying the source application, second identification information for identifying a destination application, and a requested amount of the application key used for encrypting or decrypting communication in the user network;

identifying a key manager as a sharing destination of the application key from the second identification information;

determining a sharing amount of the application key from the requested amount of the application key and state information representing an amount of application keys already shared between a key manager connected to the source application and a key manager connected to the destination application;

transmitting the application key to the key manager as the sharing destination, the application key to be transmitted having been encrypted by using the link key and satisfying the sharing amount; and transmitting the application key of the requested amount to the source application identified by the first identification information, wherein the key management method further comprises:

communicating with a quantum key distribution network (QKDN) control device in which mapping information is stored, the mapping information including the second identification information and third identification information correlated with each other, the third identification information being used for identifying a key manager transmitting the application key to the destination application;

acquiring the mapping information from the QKDN control device; and identifying the key manager as the sharing destination of the application key from the mapping information.

8. A quantum key distribution network (QKDN) control method implemented by a computer as a QKDN control device connected to a plurality of key managers, each of the key managers transmitting, to an application, an application key used for encrypting or decrypting communication between applications in a user network, the method comprising:

acquiring mapping information and state information of the application key from the key managers, the mapping information including first identification information and second identification information correlated with each other, the first identification information being used for identifying the application, the second identification information being used for identifying a key manager transmitting the application key to the application; and storing the mapping information and the state information in a storage device.

9. An information processing method implemented by a computer as an information processing device, the method comprising:

transmitting request information of an application key to a first key manager connected to a quantum key distribution (QKD) device generating a link key by QKD, the request information including first identification information for identifying a source application of a user network, second identification information for identifying a destination application, and a requested amount of an application key used for encrypting or decrypting communication in the user network;

receiving an application key shared with a second key manager to which the application key identified from the second identification information is shared such that the requested amount is satisfied; and encrypting communication in the user network by causing the source application to operate, wherein the mapping information is acquired by the first key manager communicating with a quantum key distribution network (QKDN) control device storing the mapping information including the second identification information and third identification information correlated with each other, the third identification information being used for identifying the second key manager transmitting the application key to the destination application, the second key manager as the sharing destination of the application key is identified from the mapping information, and a sharing amount of the application key is determined from the requested amount of the application key and state information representing an amount of application keys already shared between the first key manager connected to the source application and the second key manager connected to the destination application.

10. A computer program product comprising a non-transitory computer-readable recording medium on which programmed instructions are recorded, the programmed instructions being executed by a computer as a key manager connected to a quantum key distribution (QKD) device generating a link key by QKD, the programmed instructions causing the computer to execute processing of:

receiving, from a source application of a user network, request information of an application key including first identification information for identifying the source application, second identification information for identifying a destination application, and a requested amount of the application key used for encrypting or decrypting communication in the user network;

identifying a key manager as a sharing destination of the application key from the second identification information;

determining a sharing amount of the application key from the requested amount of the application key and state information representing an amount of application keys already shared between a key manager connected to the source application and a key manager connected to the destination application;

transmitting the application key to the key manager as the sharing destination, the application key to be transmitted having been encrypted by using the link key and satisfying the sharing amount; and transmitting the application key of the requested amount to the source application identified by the first identification information, wherein the programmed instructions cause the computer to further execute processing of:

communicating with a quantum key distribution network (QKDN) control device in which mapping information is stored, the mapping information including the second identification information and third identification information correlated with each other, the third identification information being used for identifying a key manager transmitting the application key to the destination application;

acquiring the mapping information from the QKDN control device; and identifying the key manager as the sharing destination of the application key from the mapping information.

* * * * *